(12) United States Patent
Hungerink et al.

(10) Patent No.: US 7,766,361 B2
(45) Date of Patent: Aug. 3, 2010

(54) ROTATING FIFTH WHEEL HITCH KINGPIN ASSEMBLY

(75) Inventors: Gerald W. Hungerink, Holland, MI (US); Steven C. Dupay, Holland, MI (US); Richard T. Polanic, Hudsonville, MI (US); Eric M. Terpsma, Holland, MI (US); Jason D. C. Howe, Holland, MI (US); Justin D. Keatley, Zeeland, MI (US); Daniel R. Dykstra, Grand Rapids, MI (US); Randy L. Schutt, Holland, MI (US)

(73) Assignee: SAF-Holland, Inc., Holland, MI (US)

( * ) Notice: Subject to any disclaimer, the term of this patent is extended or adjusted under 35 U.S.C. 154(b) by 153 days.

(21) Appl. No.: 11/924,128

(22) Filed: Oct. 25, 2007

(65) Prior Publication Data
US 2009/0108556 A1 Apr. 30, 2009

(51) Int. Cl.
*B62D 53/06* (2006.01)
(52) U.S. Cl. ............... 280/433; 280/434; 280/407; 280/438.1; 280/439; 280/441; 280/441.1; 280/440; 384/421
(58) Field of Classification Search ............... 280/433, 280/434, 407, 438.1, 439, 441, 441.1, 440; 384/421
See application file for complete search history.

(56) References Cited

U.S. PATENT DOCUMENTS

| | | | |
|---|---|---|---|
| 2,838,324 A | 6/1958 | Dalton | |
| 2,907,582 A | 10/1959 | Bourke | |
| 2,958,541 A | 11/1960 | Bar | |
| 3,520,557 A | 7/1970 | Kamman et al. | |
| 3,600,005 A * | 8/1971 | Glaza | 280/433 |
| 3,807,765 A | 4/1974 | Pokornicki | |
| 3,807,766 A | 4/1974 | Pleier et al. | |
| 3,811,708 A | 5/1974 | Baaso | |
| 3,887,251 A | 6/1975 | McKay | |
| 4,254,967 A | 3/1981 | Scanlon | |
| 5,411,281 A | 5/1995 | Poirier | |
| 6,073,952 A | 6/2000 | Schulz | |
| 6,220,617 B1 | 4/2001 | Hunger | |
| 6,322,093 B1 | 11/2001 | Athans et al. | |
| 6,565,109 B1 | 5/2003 | Kloepfer | |
| 6,773,023 B2 | 8/2004 | Athans et al. | |
| 6,877,757 B2 | 4/2005 | Hayworth | |
| 7,451,995 B2 * | 11/2008 | Bloodworth et al. | 280/433 |
| 2001/0028160 A1 | 10/2001 | Athans et al. | |
| 2002/0190497 A1 | 12/2002 | Metternich | |

FOREIGN PATENT DOCUMENTS

GB 2128952 5/1984

* cited by examiner

*Primary Examiner*—Lesley Morris
*Assistant Examiner*—Marlon A Arce
(74) *Attorney, Agent, or Firm*—Price, Heneveld, Cooper, DeWitt & Litton, LLP

(57) ABSTRACT

A kingpin assembly comprises a housing having a recess located therein, a collar member operably coupled to the housing, and an integral single-piece kingpin having at least a portion located within the recess of the housing, wherein the housing and collar cooperate to rotationally secure the kingpin within the recess of the housing, and wherein the kingpin provides a sole rotational support for the kingpin with respect to the housing and the collar.

14 Claims, 15 Drawing Sheets

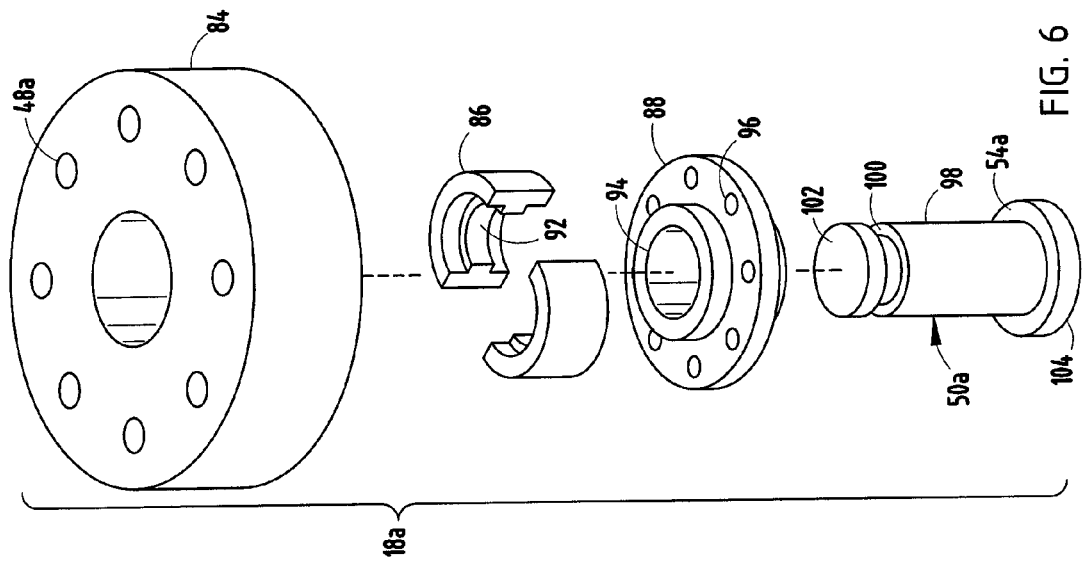
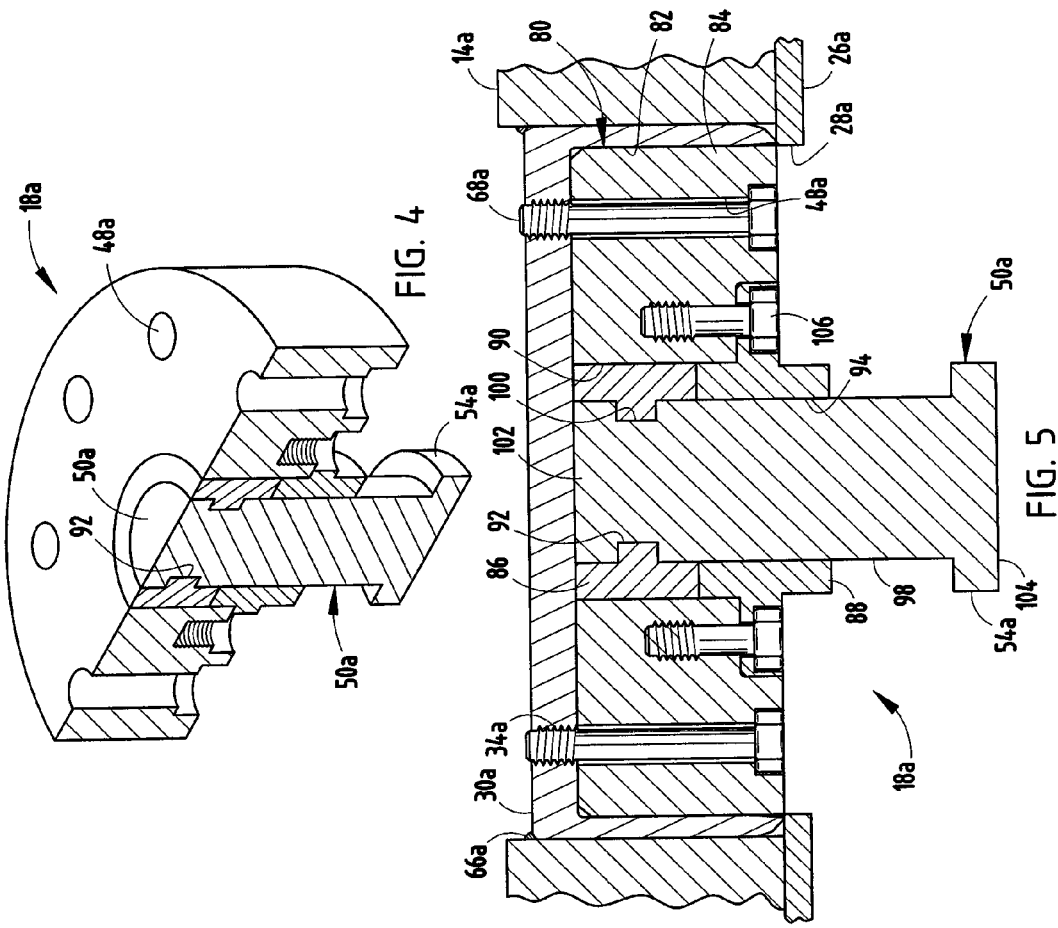

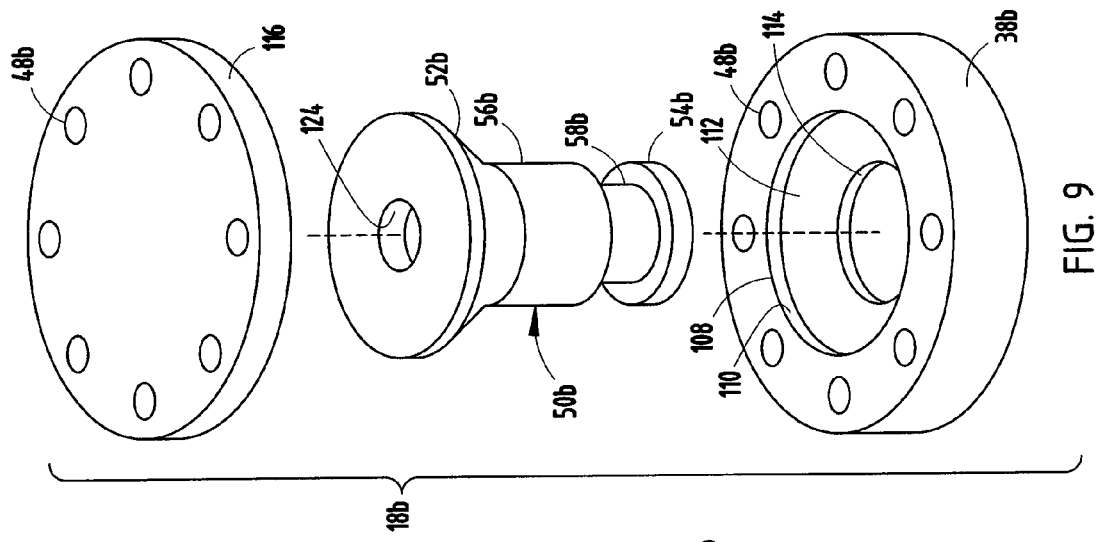
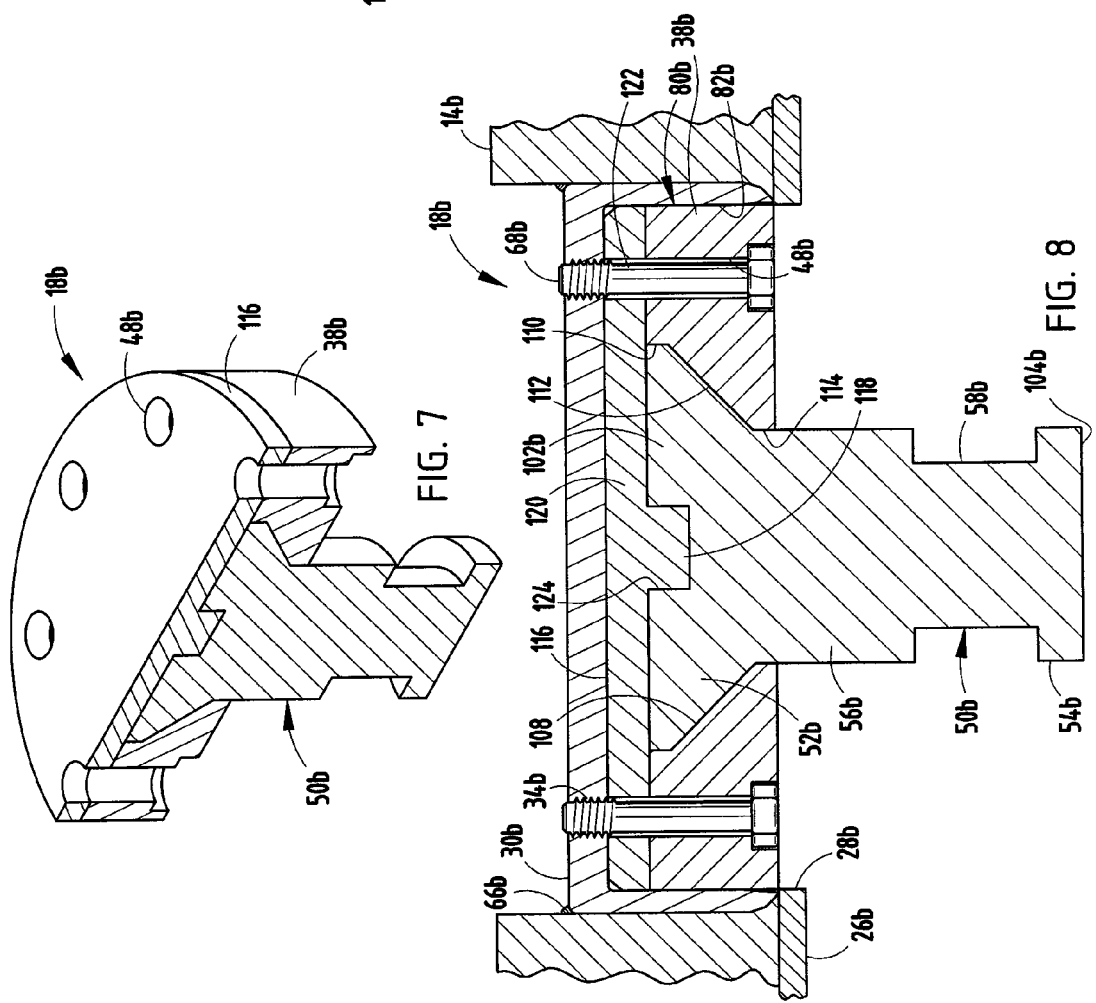

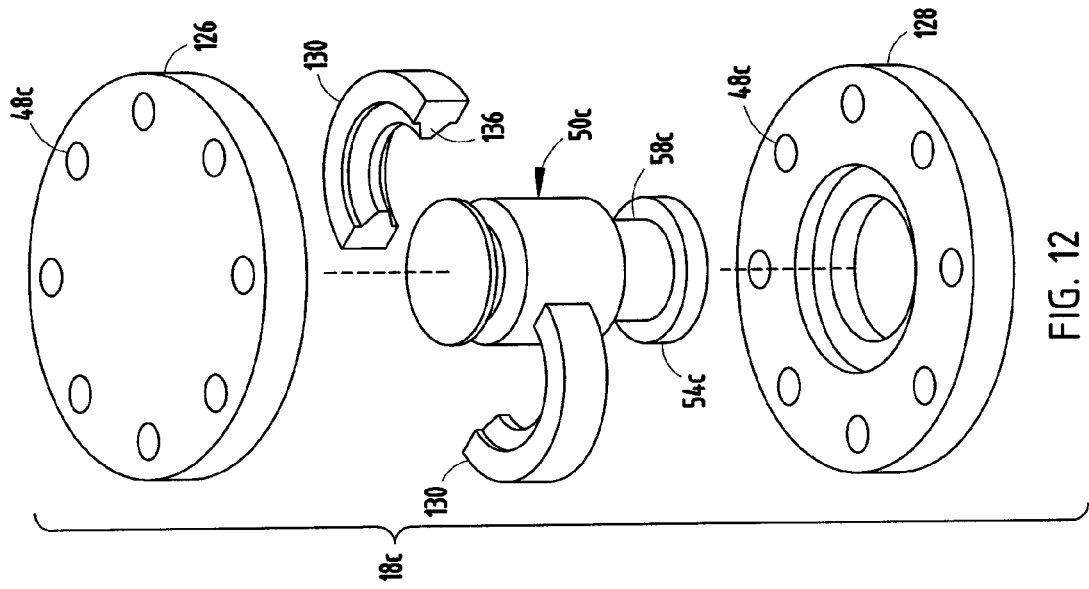
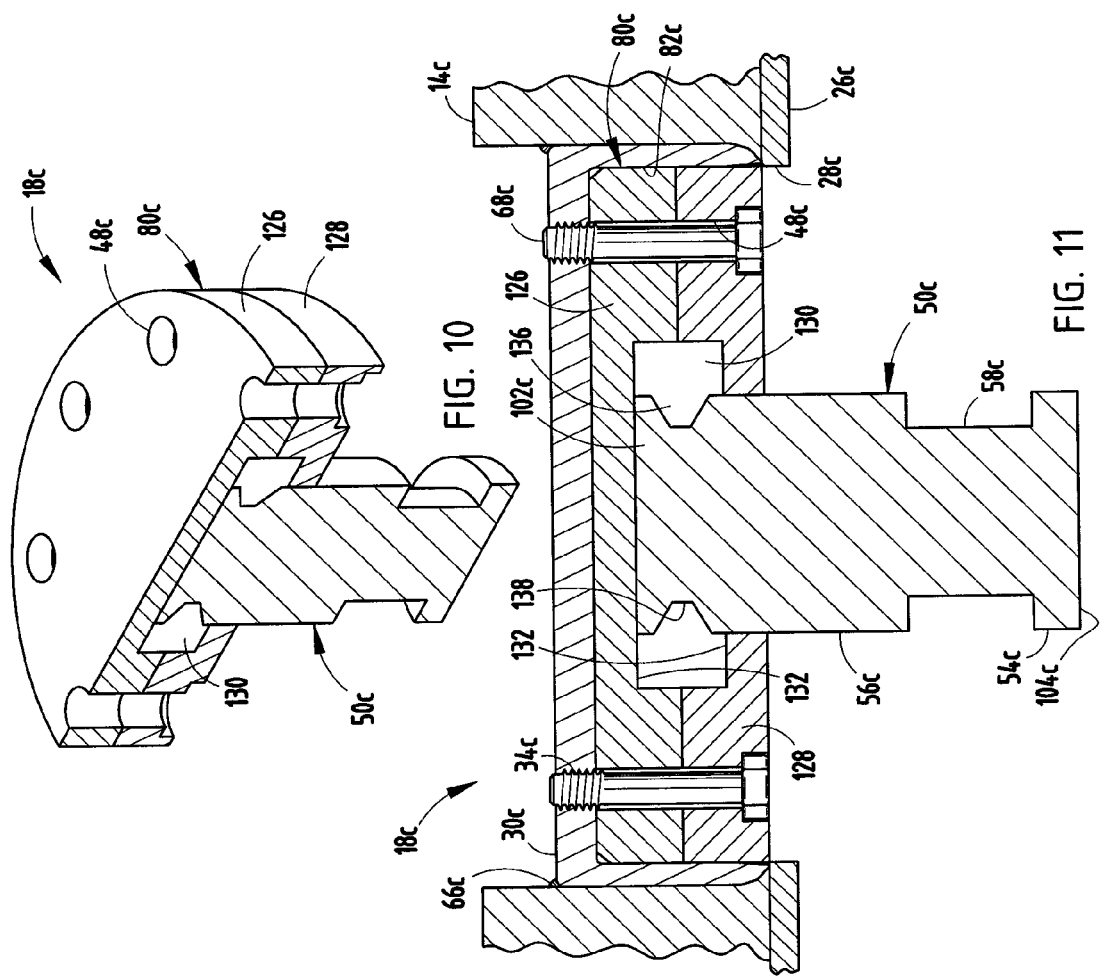

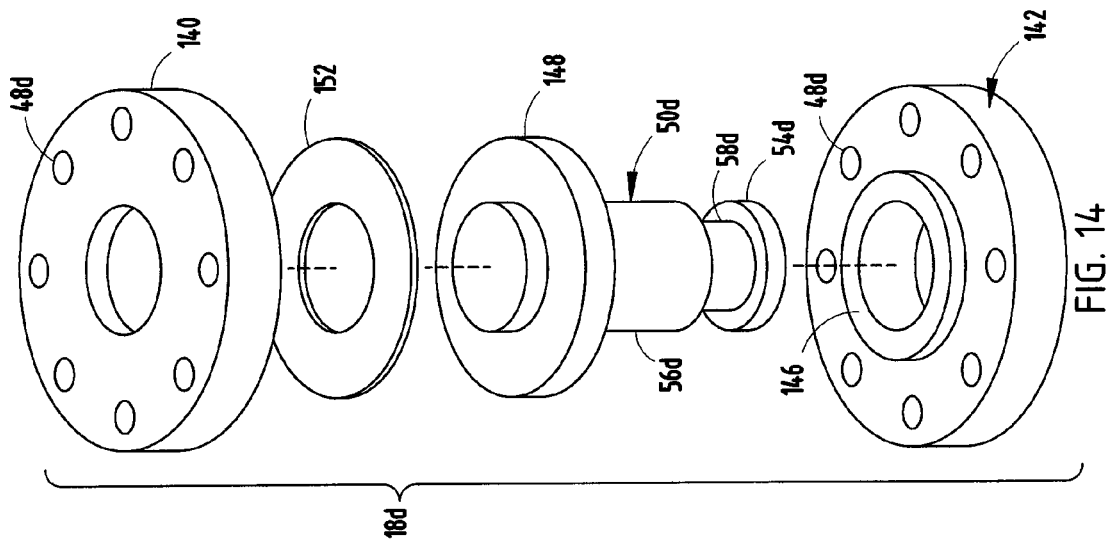
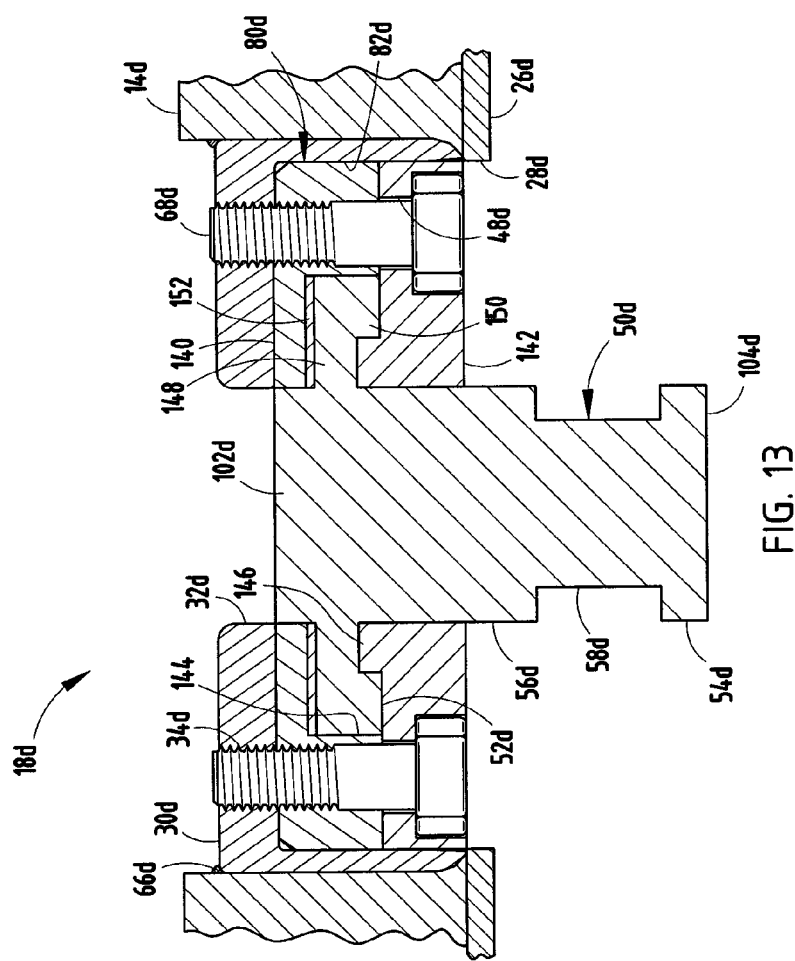

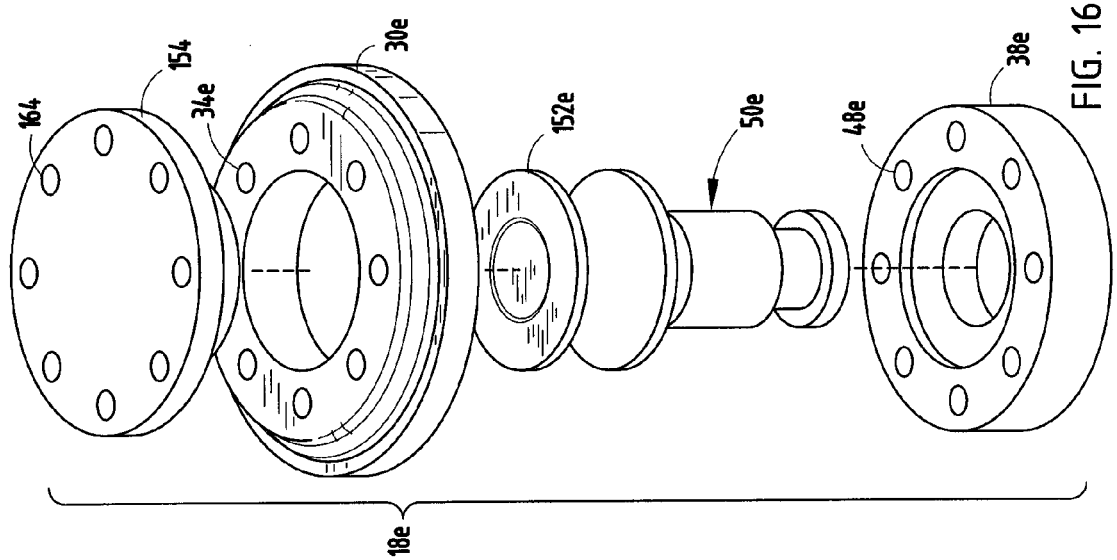
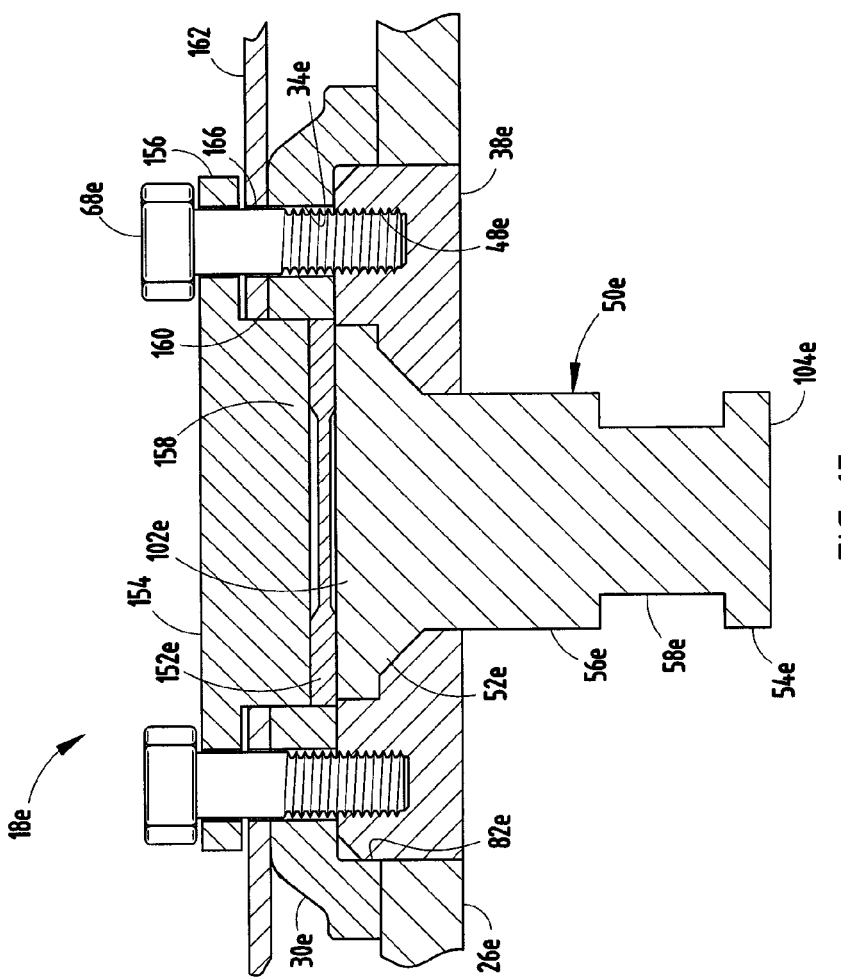

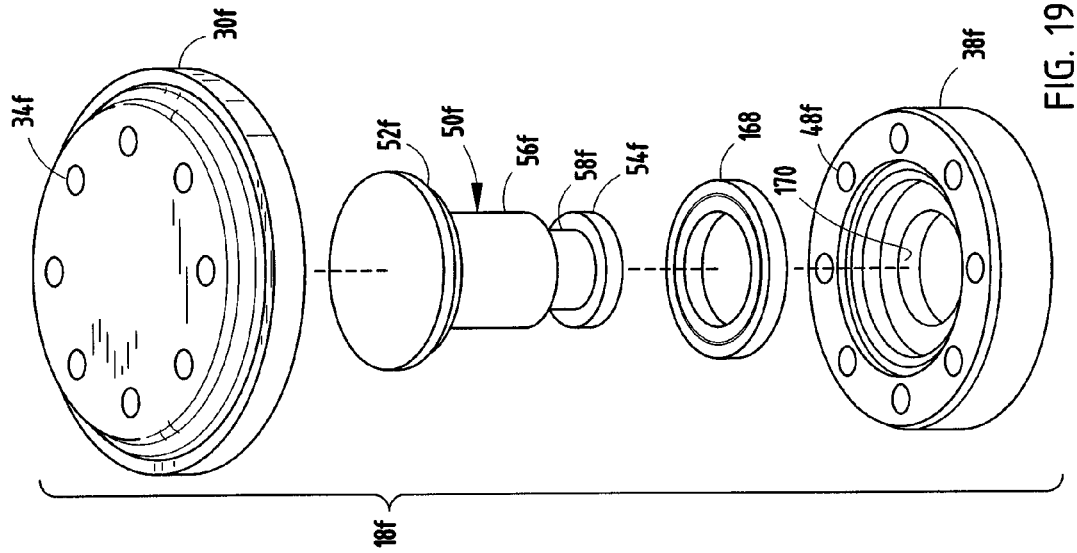
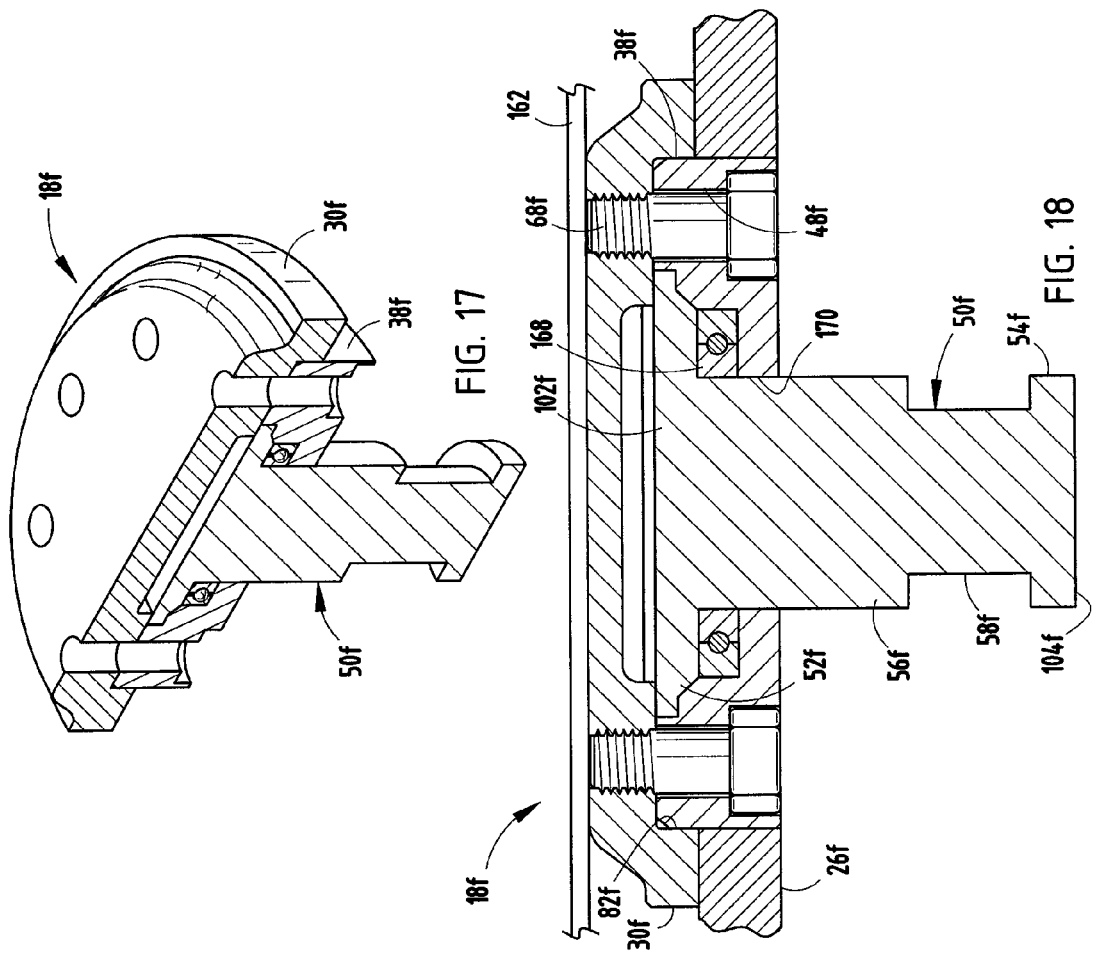

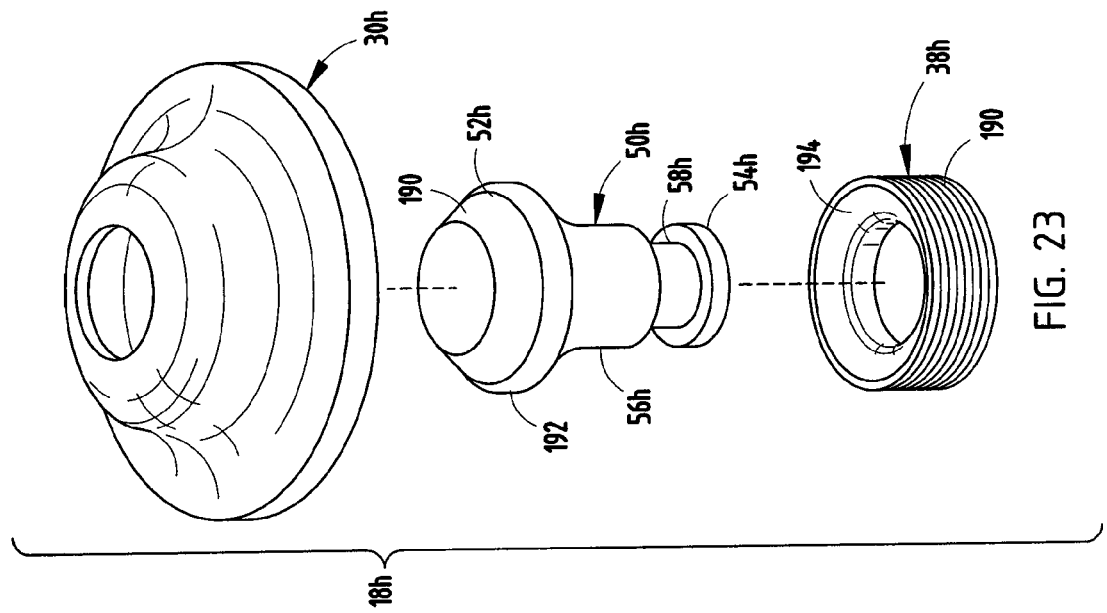
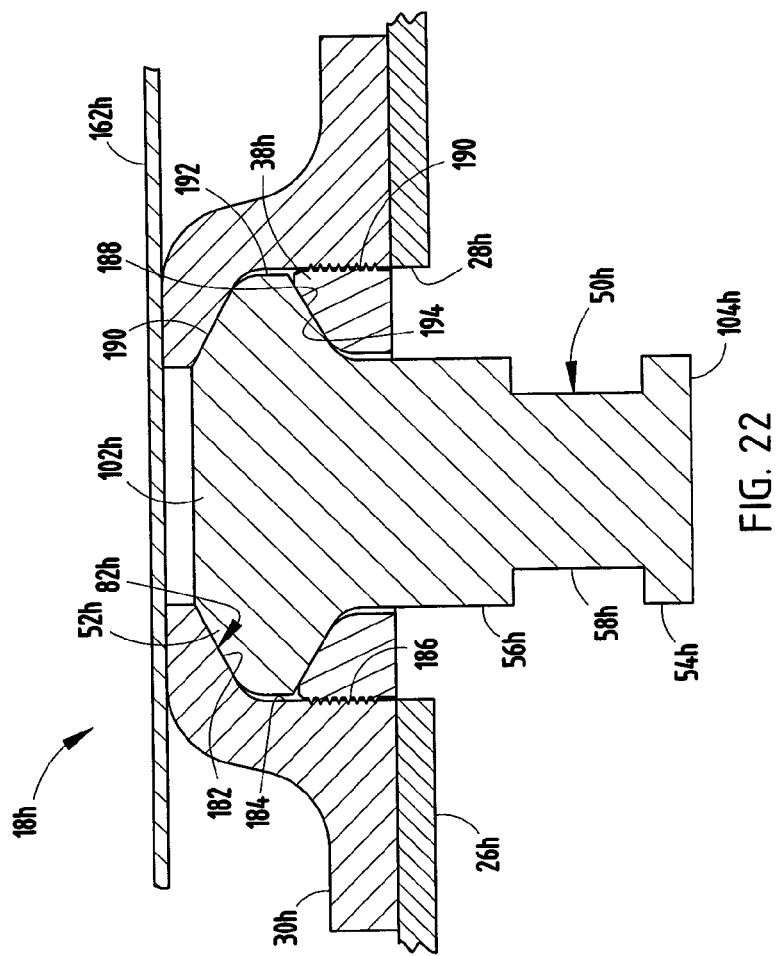

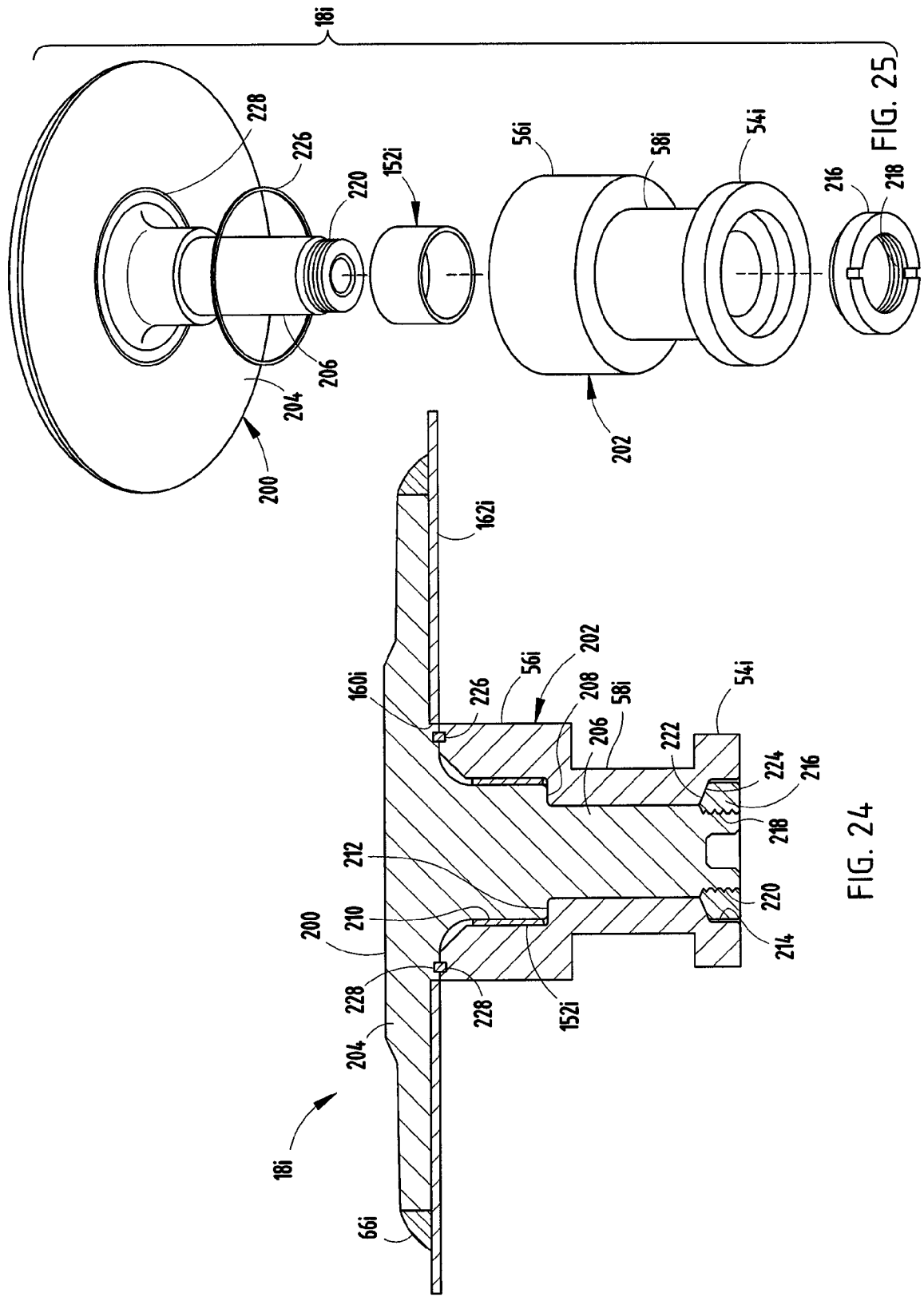

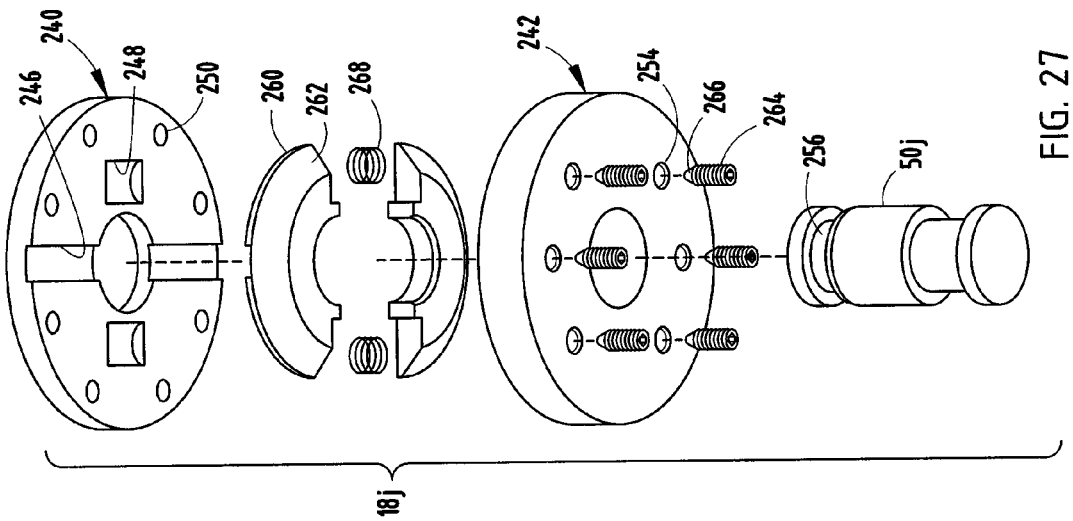
FIG. 27
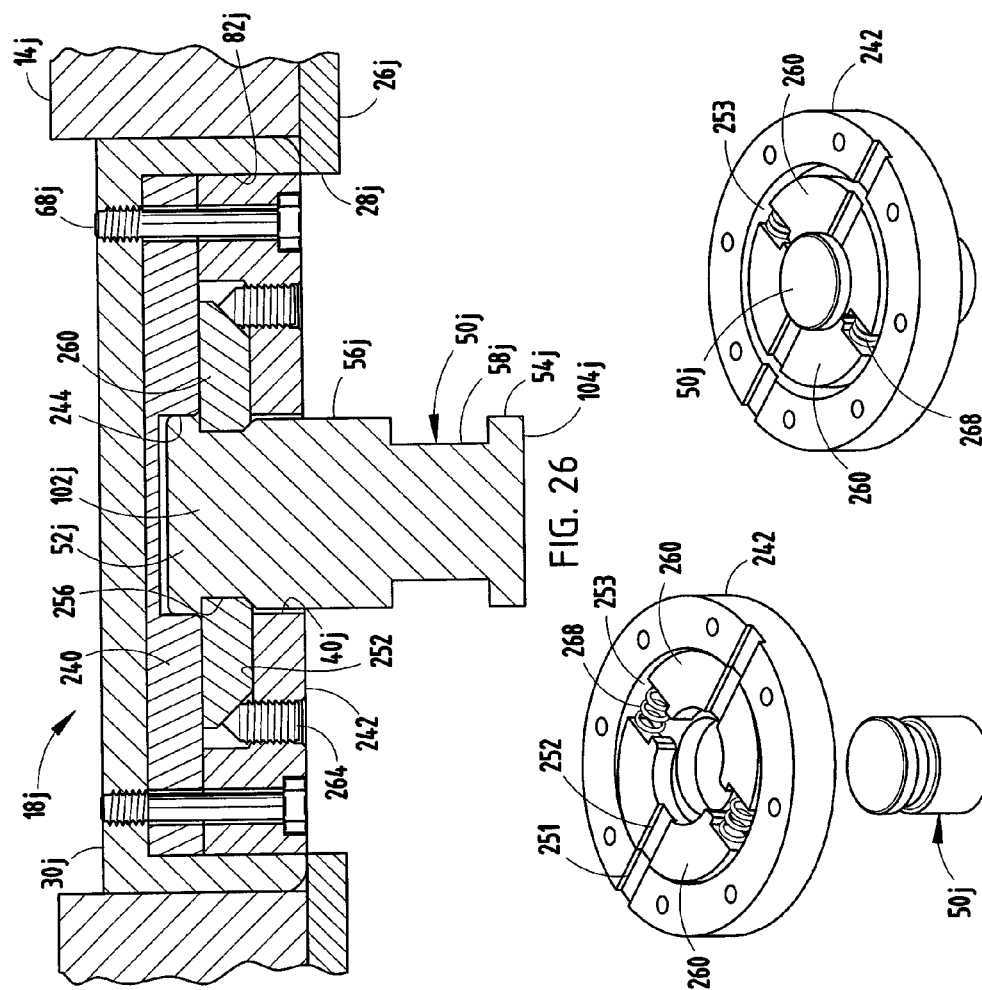
FIG. 26
FIG. 29
FIG. 28

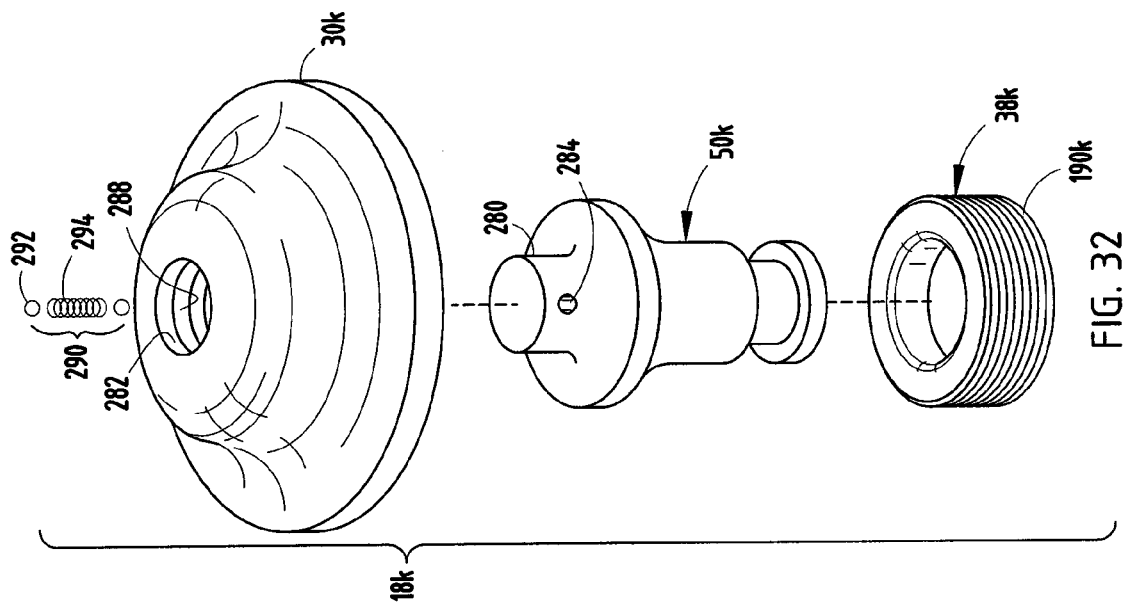
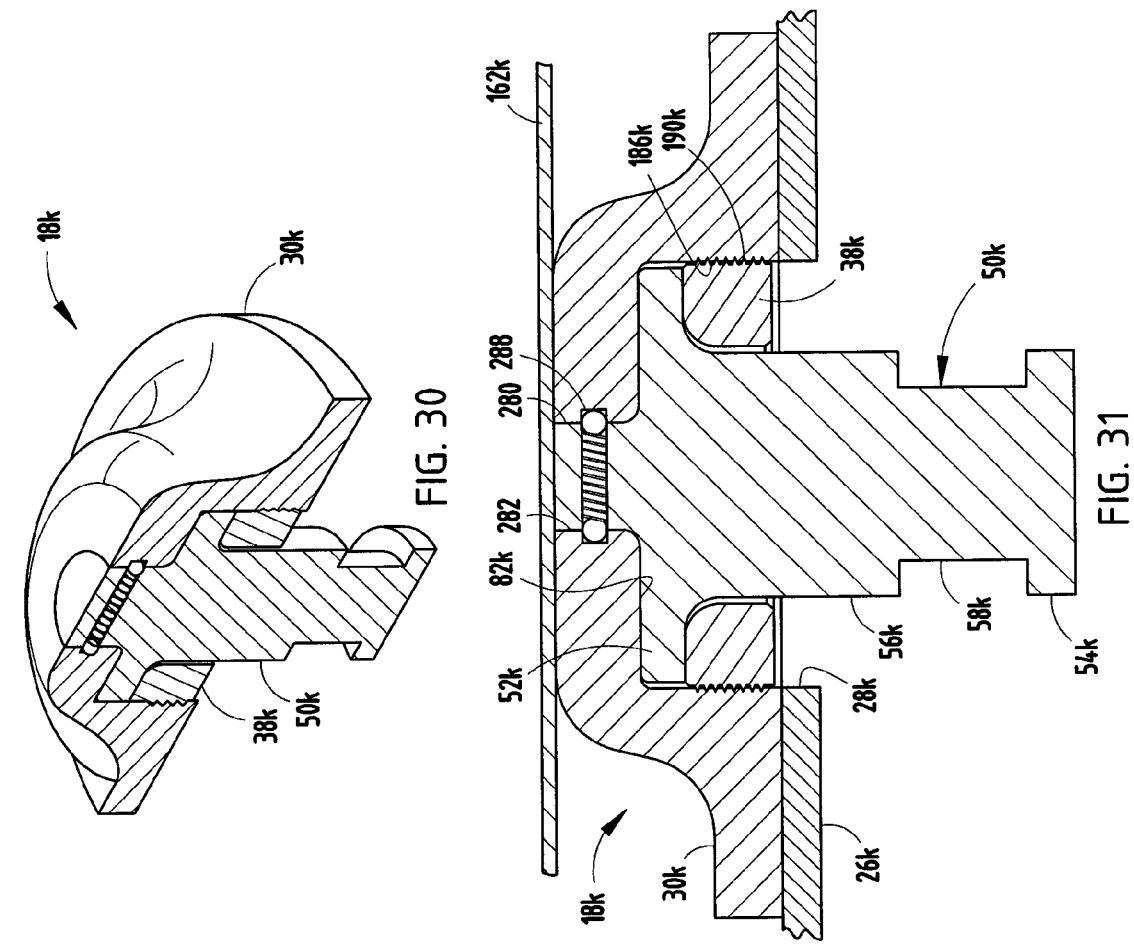

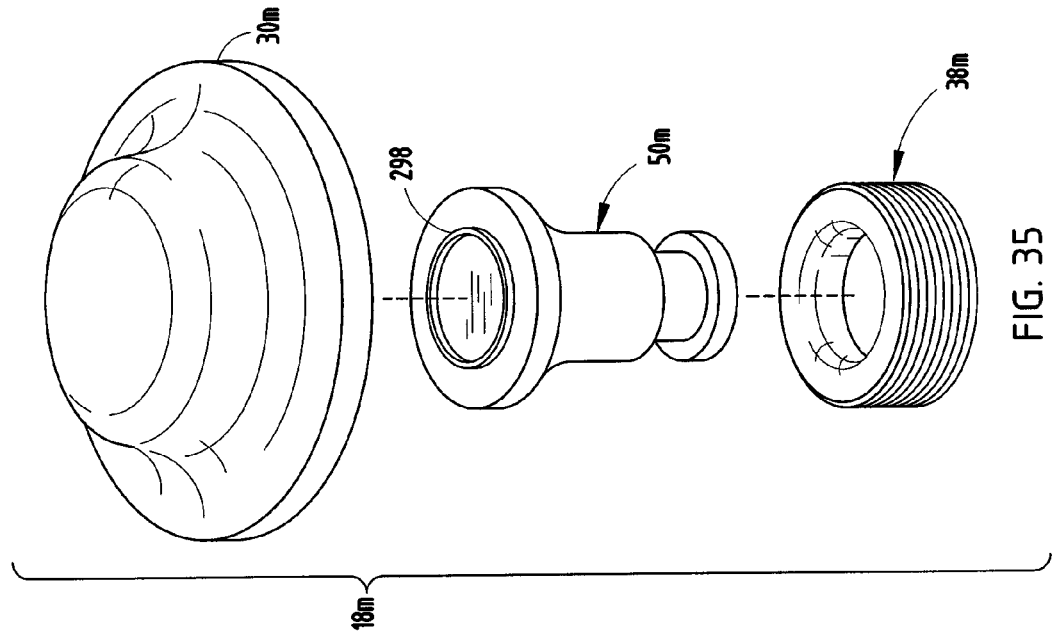
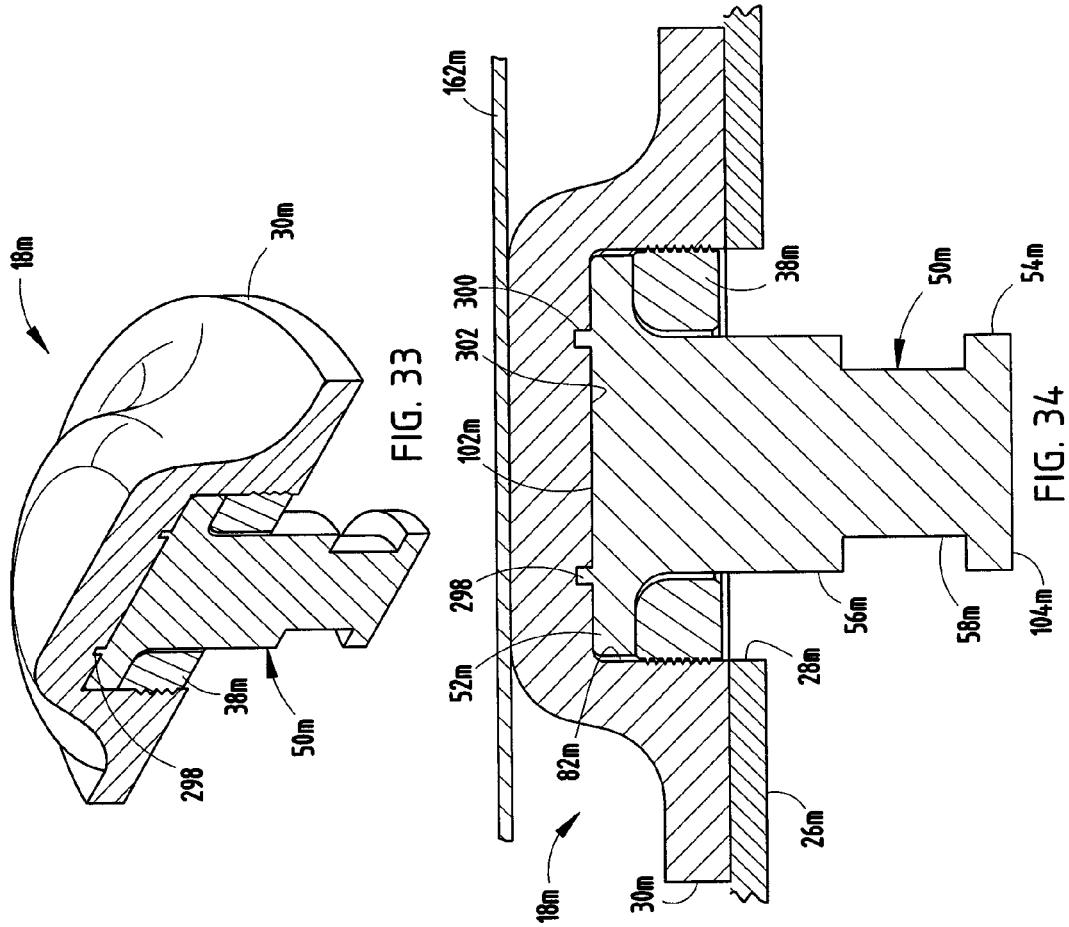

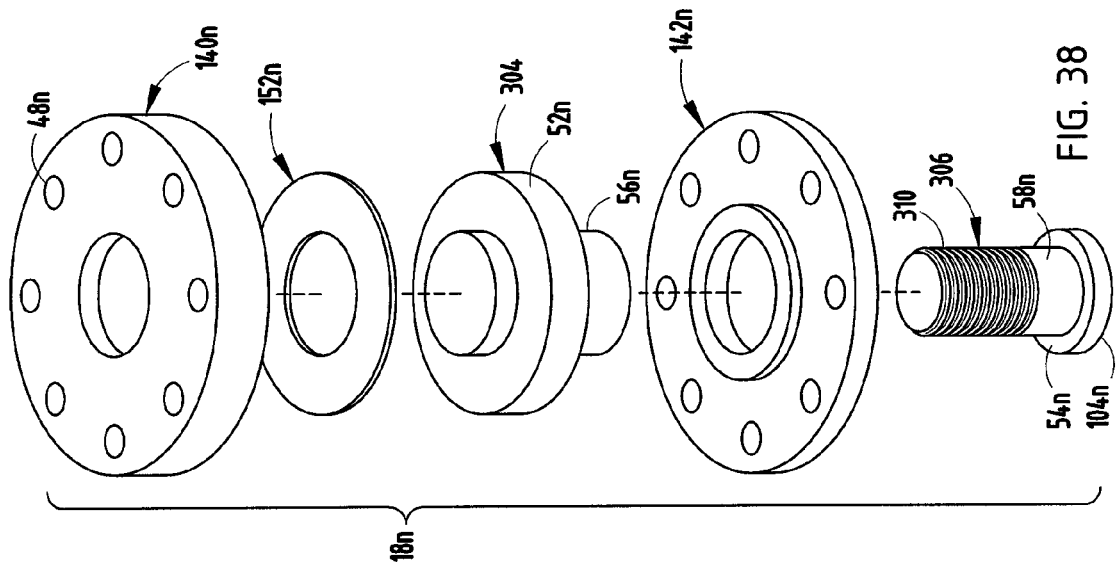
FIG. 38
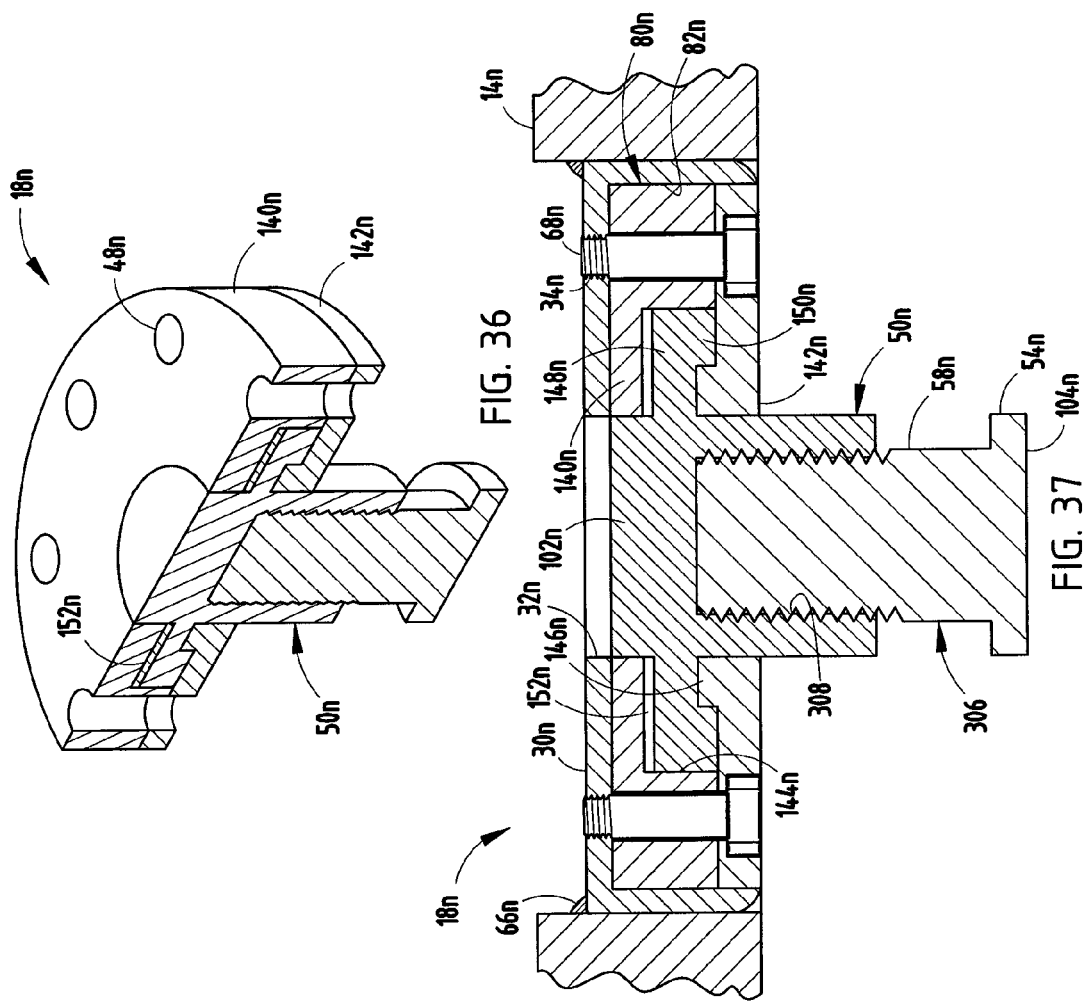
FIG. 36
FIG. 37

ROTATING FIFTH WHEEL HITCH KINGPIN ASSEMBLY

BACKGROUND OF THE INVENTION

The present invention relates to a kingpin assembly for use within a fifth wheel hitch assembly, and particularly to a kingpin assembly that includes a freely rotating kingpin that allows rotation of the kingpin separate from the remaining components of the assembly during operational use thereof.

SUMMARY OF THE INVENTION

One aspect of the present invention is to provide the kingpin assembly that comprises a housing having a recess located therein, a column member operably coupled to the housing member, and an integral single-piece kingpin having at least a portion located within the recess of the housing, wherein the housing and the collar cooperate to rotationally secure the kingpin within the recess of the housing, and wherein the kingpin provides a sole rotational support for the kingpin with respect to the housing and the collar.

Another aspect of the present invention is to provide a kingpin assembly that comprises an elongated post member having an outer surface, a tubular sleeve member rotationally received about the post member and having an inner surface facing the outer surface of the post member, and an outer wear surface adapted to abut a coupling mechanism of a fifth wheel hitch assembly. The kingpin assembly further comprises a locking member abutting the sleeve member and preventing axial movement of the sleeve member with respect to the post member.

Still another aspect of the present invention is to provide a kingpin assembly that comprises a housing having a recess located therein, a collar member operably coupled to the housing member, a kingpin having at least a portion located within the recess of the housing and a circumferentially-extending relief, wherein the housing and collar cooperate to rotationally secure the kingpin within the recess of the housing, and a retention assembly. The retention assembly comprises at least one linearly-adjustably securing member movable between a first position, wherein at least one securing member is positioned within relief of the kingpin, thereby rotationally securing the kingpin within the recess of the housing, and a second position, wherein the kingpin is removable from within the recess of the housing.

Still yet another aspect of the present invention is to provide a kingpin assembly that comprises an elongated first member adapted to be rotatably received within a kingpin housing, and having a longitudinally-extending threaded aperture, and an elongated second member having a neck portion adapted to couple to the coupling assembly of a fifth wheel hitch assembly, a distally-located head portion having a diameter larger than a diameter of the neck portion, and a proximally-located threaded portion that is threadably received within the aperture of the first member.

Another aspect of the present invention is to provide a kingpin assembly that comprises a housing having a recess located therein, a collar member operably coupled to the housing member, and a kingpin having at least one portion located within the recess of the housing, wherein the housing and the collar cooperate to rotationally secure the kingpin within the recess of the housing. The kingpin includes a cylindrically-shaped body portion having a first diameter, a neck portion having a second diameter that is less than the first diameter and a head portion having a third diameter that is greater than the first diameter and a ring portion that extends outwardly from the body portion that operably engages at least a select one of the housing and the collar member, thereby inhibiting axial displacement of the kingpin with respect to the housing.

The present inventive kingpin assembly allows free rotation of the kingpin by reducing operational wear of the same, allows easy access to and replacement of an associated kingpin subsequent to wear thereof, reduces the amount of maintenance typically required for fifth wheel hitch assemblies, and reduces wear due to debris entering the overall assembly. Further, the present inventive assembly is more durable, allows replacement of certain components thereof by even unskilled personnel, is extremely efficient in use, capable of a long operating life, and particularly well adapted for the proposed use.

These and other advantages of the invention will be further understood and appreciated by those skilled in the art by reference to the following written specification, claims and appended drawings.

BRIEF DESCRIPTION OF THE DRAWINGS

FIG. 4 is a cross-sectional perspective view of a first alternative embodiment of the kingpin assembly;

FIG. 5 is a cross-sectional side view of the first alternative embodiment of the kingpin assembly;

FIG. 6 is an exploded perspective view of the first alternative embodiment of the kingpin assembly;

FIG. 7 is a cross-sectional perspective view of a second alternative embodiment of the kingpin assembly;

FIG. 8 is a cross-sectional side view of the second alternative embodiment of the kingpin assembly;

FIG. 9 is an exploded perspective view of the second alternative embodiment of the kingpin assembly;

FIG. 10 is a cross-sectional perspective view of a third alternative embodiment of the kingpin assembly;

FIG. 11 is a cross-sectional side view of the third alternative embodiment of the kingpin assembly;

FIG. 12 is an exploded perspective view of the third alternative embodiment of the kingpin assembly;

FIG. 13 is a cross-sectional side view of a fourth alternative embodiment of the kingpin assembly;

FIG. 14 is an exploded perspective view of a fourth alternative embodiment of the kingpin assembly;

FIG. 15 is a cross-sectional side view of a fifth alternative embodiment of the kingpin assembly;

FIG. 16 is an exploded perspective view of the fifth alternative embodiment of the kingpin assembly;

FIG. 17 is a cross-sectional perspective view of a sixth alternative embodiment of the kingpin assembly;

FIG. 18 is a cross-sectional side view of the sixth alternative embodiment of the kingpin assembly;

FIG. 19 is an exploded perspective view of the sixth alternative embodiment of the kingpin assembly;

FIG. 22 is a cross-sectional side view of an eighth alternative embodiment of the kingpin assembly;

FIG. 23 is an exploded perspective view of the eighth alternative embodiment of the kingpin assembly;

FIG. 24 is a cross-sectional side view of a ninth alternative embodiment of the kingpin assembly;

FIG. 25 is an exploded perspective view of the ninth alternative embodiment of the kingpin assembly;

FIG. 26 is a cross-sectional side view of a tenth alternative embodiment of the kingpin assembly;

FIG. 27 is an exploded perspective view of the tenth alternative embodiment of the kingpin assembly;

FIG. 28 is a perspective view of the tenth alternative embodiment of the kingpin assembly, wherein a kingpin of the kingpin assembly is disassembled from the remaining portions of the assembly;

FIG. 29 is a perspective view of the tenth alternative embodiment of the kingpin assembly, wherein the kingpin is assembled with the remaining portions of the kingpin assembly;

FIG. 30 is a cross-sectional perspective view of an eleventh alternative embodiment of the kingpin assembly;

FIG. 31 is a cross-sectional side view of the eleventh alternative embodiment of the kingpin assembly;

FIG. 32 is an exploded perspective view of the eleventh alternative embodiment of the kingpin assembly;

FIG. 33 is a cross-sectional perspective view of a twelfth alternative embodiment of the kingpin assembly;

FIG. 34 is a cross-sectional side view of the twelfth alternative embodiment of the kingpin assembly;

FIG. 35 is an exploded perspective view of the twelfth alternative embodiment of the kingpin assembly;

FIG. 36 is a cross-sectional perspective view of a thirteenth alternative embodiment of the kingpin assembly;

FIG. 37 is a cross-sectional side view of the thirteenth alternative embodiment of the kingpin assembly; and FIG. 38 is an exploded perspective view of the thirteenth alternative embodiment of the kingpin assembly.

DETAILED DESCRIPTION OF THE PREFERRED EMBODIMENTS

Figure 1:
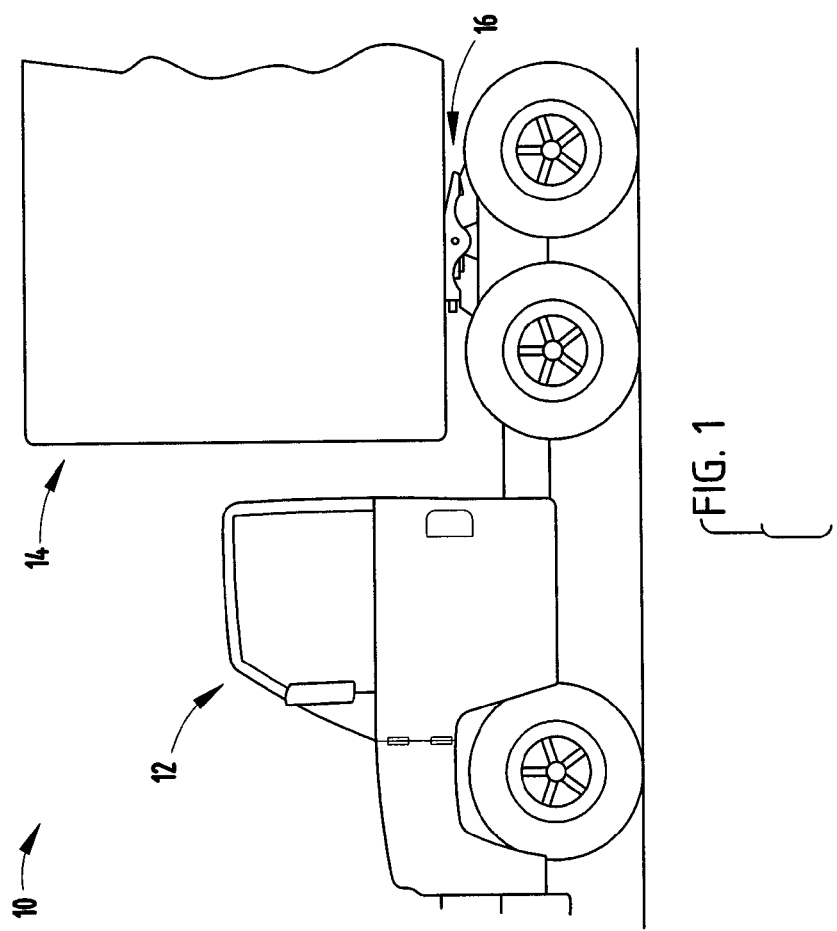
FIG. 1 is a side elevational view of a tractor and heavy duty trailer supported thereby.
Figure 3:
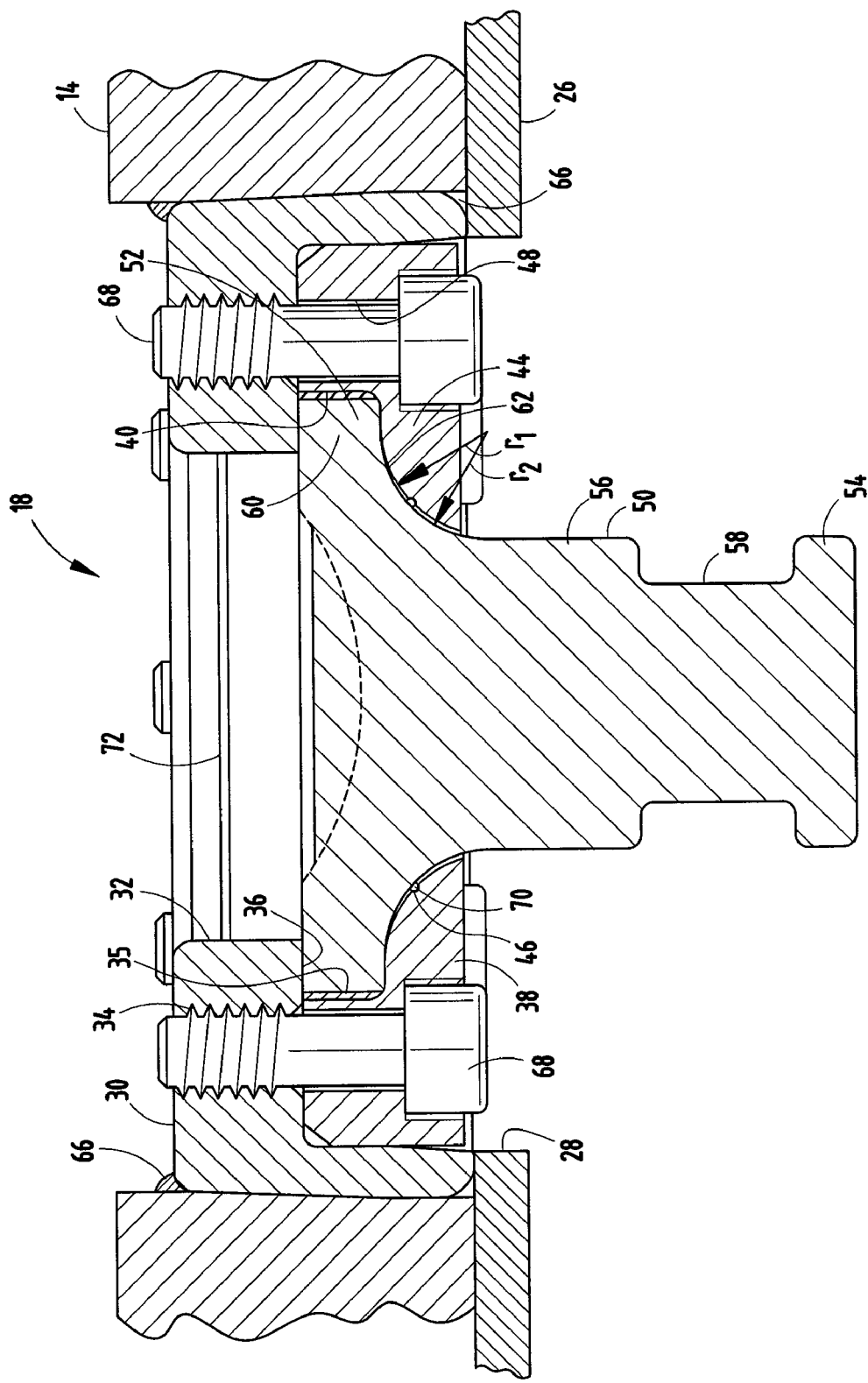
FIG. 3 is a cross-sectional side view of the kingpin assembly taken through the line III-III, FIG. 2.

For purposes of description herein, the terms "upper," "lower," "right," "left," "rear," "front," "vertical," "horizontal," and derivatives thereof shall relate to the invention as oriented in FIGS. 1, 3, and the like. However, it is to be understood that the invention may assume various alternative orientations and step sequences, except where expressly specified to the contrary. It is also to be understood that the specific devices and processes illustrated in the attached drawings, and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
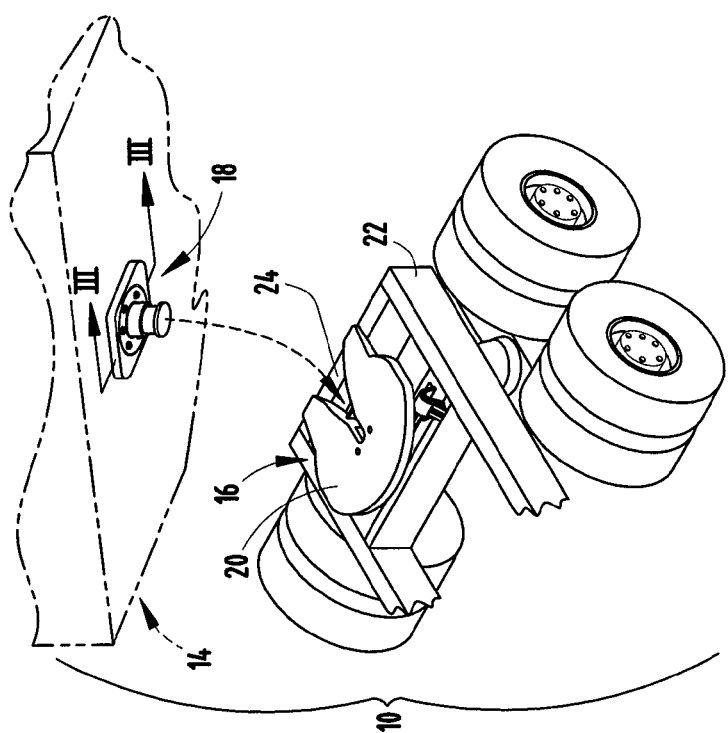
FIG. 2 is a perspective view of a fifth wheel hitch assembly and kingpin assembly of the present invention.

The reference numeral 10 (FIG. 1) generally designates a heavy duty tractor and trailer combination, wherein a tractor 12 operationally supports an associated trailer 14 via a fifth wheel hitch assembly 16 (FIG. 2) and a kingpin assembly 18 cooperating therewith and generally embodying the present invention. In the illustrated example, the fifth wheel hitch assembly 16 includes a fifth wheel hitch plate 20 pivotally coupled to a frame 22 of the associated tractor 12 and including a tapered kingpin-receiving throat and a locking assembly (not shown) as well known in the art.

The kingpin assembly 18 (FIG. 3) is adapted for use within a trailer skid plate 26 mounted to an underside of the associated trailer 14. The trailer skid plate 26 includes an aperture 28 extending therethrough and that receives the kingpin assembly 18 therein. The kingpin assembly 18 includes a housing 30 having a recess in the form of a centrally-located aperture 32 extending therethrough, and a plurality of threaded bolt-receiving apertures 34 spaced about the aperture 32. The recess 32 further includes a step wall 36. The kingpin assembly 18 further includes a ring-shaped collar member 38 including a centrally-located aperture that defines a cylindrically-shaped first portion 40 and an axially arcuately-shaped second portion 44 defining a radius $r_1$. The collar member 38 further includes a circumferentially-extending step or groove 46 located along a length of the second portion 44 of the aperture 40. The collar member 38 further includes a plurality of bolt-receiving apertures 48 spaced about the aperture 40 and that are co-aligned with the apertures 34 of the housing 30 when the collar member 38 is coupled with the housing 30, as described below.

The kingpin assembly 18 further comprises a kingpin 50 that includes an upper head portion 52, a lower head portion 54, a body portion 56, and a lock assembly-receiving portion 58. The upper head portion 52 of the kingpin 50 includes a cylindrical first portion 60 and an axially arcuately-shaped second portion 62 located between the first portion 60 and the body portion 56. The second portion 62 of the upper head portion 52 defines a radius $r_2$. The lock-assembly receiving portion or neck portion 58 is reduced in size relative to the overhead portion 54 and the body portion 56, and is adapted to receive the locking jaws (not shown) of an associate fifth wheel lock assembly thereabout.

In assembly, the housing 30 is placed above the aperture 28 of the trailer skid plate 26 and welded thereto about a circumference 66. The kingpin 50 is placed within the collar member 38 with the collar member 38 being secured to the associated housing 30 via a plurality of bolts 68. It is noted that a seal member in the form of an O-ring 70 is located within the groove 46, and that a wear disk 35 comprising a friction reducing material is located between the first position 60 of the kingpin 50, and the collar member 38. It is further noted that the radius $r_1$ of the second portion 44 of the collar member 38 and the radius $r_2$ of the second portion 62 of the upper head portion 52 of the kingpin 50 are each varying in distance about their respective arcs, and that the radii $r_1$, $r_2$ vary with respect to one another, such that the total area of the mating surfaces of the respective parts are reduced, thereby reducing the associated operational wear.

The kingpin assembly 18 further includes a dirt cover 72 welded within the aperture 32 of the housing 30, thereby preventing contamination of the pivoting couple between the kingpin 50 and the collar member 38. Alternatively, the dirt cover could be integrally formed with the housing 30.

In operation, the kingpin 50 is coupled to the associated fifth wheel hitch assembly 16 when locking jaws of the fifth wheel hitch assembly 16 are received about the lock assembly-receiving portion 58 of the kingpin 50 defined between the lower head portion 54 and the body portion 56 thereof. As the tow vehicle or tractor 12 turns out of alignment with respect to the towed trailer 14, the kingpin 50 is allowed to pivot with the components of the tractor 12 and the associated fifth wheel hitch assembly 16 without requiring movement of the housing 30, the collar member 38, nor any other component of the kingpin assembly 18.

The reference numeral 18a (FIGS. 4-6) generally designates another embodiment of the present invention, having a housing 30a, a collar 80, and a kingpin 50a. Since kingpin assembly 18a is similar to the previously described kingpin assembly 18, similar parts appearing in FIG. 1 and FIGS. 4-6 respectively are represented by the same, corresponding numeral, except for the suffix "a" in the numerals of the latter. The housing 30a includes a recess or pocket 82 within which the collar 80 is affixed by a plurality of bolts 68a. The collar 80 comprises an outer member 84, a pair of coupling members 86, and a retainer member 88. The outer member 84 includes a bore 90 within which the coupling members 86 and the retainer member 88 are received. Each coupling member 86 is arcuately-shaped and includes a circumferentially-extending rib 92. The retainer member 88 is disk-shaped and includes a central aperture 94 within which the kingpin 50a is rotationally received. The retainer member 88 further includes a plurality of bolt-receiving apertures space circumferentially thereabout. The kingpin 50a includes a cylindrically-shaped body portion 98 with a circumferentially extending groove 100 located near a proximal end 102 thereof. The kingpin 50a further includes a lower head portion 54a located near a distal end 104 thereof.

The kingpin assembly 18a is assembled with the overall trailer assembly 14a in a manner similar to that of kingpin assembly 18a as described above. With reference to this particular embodiment, the body portion 98 of the kingpin 50a is placed within the central aperture 94 of the retainer member 88. The cooperating coupler members 86 are then placed about the body portion 98 such that the ribs 92 are located within the groove 100. The kingpin 50a, the coupler members 86 and the retainer member 88 are then placed within the bore 90 of the outer member 84 and are held into position by a plurality of bolts 106 located within the apertures 96 and threadably received into the outer member 84. The outer member 84 is then placed within the recess or pocket 82 of the housing 30a and secured thereto by a plurality of bolts 68a. It is noted that the kingpin 50a of the kingpin assembly 18a has a relatively narrow diameter along the entire length thereof, thereby allowing the kingpin 50a to be machined from a single piece of bar stock and avoiding relatively costly forging manufacturing methods while providing a kingpin with the necessary structural integrity.

The reference numeral 18b (FIGS. 7-9) generally designates another embodiment of the present invention, including a kingpin assembly 18b. Since the kingpin assembly 18b is similar to the previously-described kingpin assembly 18 and kingpin assembly 18a, similar parts appearing in FIG. 3 and FIGS. 7-9 and FIGS. 10-12 respectively, are represented by the same, corresponding numeral, except for the suffix "b" in the numerals of the latter. The kingpin assembly 18b includes a collar member 38b having a central bore 108 and a plurality of apertures 48b spaced circumferentially thereabout. The central bore 108 includes a cylindrically-shaped upper portion 110, a conically-shaped middle portion 112, and a cylindrically-shaped lower portion 114. The kingpin assembly 18b further includes a housing lid 116 having a centrally-located and cylindrically-shaped guide portion 118 extending downwardly from a plate-shaped body portion 120. The body portion 120 of the lid 116 includes a plurality of apertures spaced around the circumference thereof. The kingpin assembly 18b further includes a kingpin 50b that includes an upper head portion 52b, a lower head portion 54b, a body portion 56b, and a lock assembly-receiving portion 58b. The upper head portion 52b is generally conically-shaped, and includes a centrally-located, cylindrically-shaped aperture 124.

In assembly, the kingpin 50b is placed within the collar member 38b and the lid 116 is placed thereon such that the guide portion 118 is aligned with and received within the aperture 124. The kingpin 50b, the collar member 38b and the lid 116 are then positioned within the recess 82b of the housing 30b and held in position by a plurality of bolts 68b extending through the apertures 48b and the apertures 122 of the lid 116, and threadably received within the apertures 34b.

The reference numeral 18c (FIGS. 10-12) generally designates another embodiment of the present inventive kingpin assembly. Since the kingpin assembly 18c is similar to the previously described kingpin assembly 18b, similar parts appearing in FIGS. 7-9 and FIGS. 10-12 respectfully are represented by the same, corresponding reference numeral, except for the suffix "c" in the numerals of the latter. In the illustrated example, the kingpin assembly 18c includes an upper locking member 126, a lower locking member 128, a pair of locking retainer members 130, and the kingpin 50c. The upper locking member 126 and the lower locking member 128 are each plate-shaped and include a centrally-located, cylindrically-shaped recess 132, and a plurality of bolt-receiving apertures 48c spaced about the circumference thereof. Each locking retainer member 130 is arcuately-shaped and includes a circumferentially-extending isosceles trapezoidal-shaped guide rib 136. The kingpin 50c includes a body portion 56c having a isosceles-trapezoidal-shaped groove 138 extending circumferentially thereabout and located near the proximal end 102c.

In assembly, the locking retainer members 130 are placed about the kingpin 50c such that the ribs 136 are received within the groove 138. The upper locking member 126 and the lower locking member 128 are placed about the kingpin 50c and the locking retainer members 130 such that the locking retainer members 130 are positioned within the recesses 132 of the upper locking member 126 and the lower locking member 128. The kingpin 50c, the upper locking member 126, the lower locking member 128 and the locking retainer members 130 are then placed within the recess 82c of the housing 30c and are secured thereto by a plurality of bolts 68c that extend through the apertures 48c and are threadably received into the apertures 34c.

The reference numeral 18d (FIGS. 13 and 14) generally designates another embodiment of the present inventive kingpin assembly. Since the kingpin assembly 18d is similar to previously-described kingpin assembly 18 and kingpin assembly 18c, similar parts appearing in FIGS. 3 and 10-12 and FIGS. 13 and 14, respectively, are represented by the same, corresponding reference numeral, except for the suffix "d" in the numerals of the latter. In the illustrated example, the kingpin assembly 18d includes a collar 80d and a kingpin 50d. The collar 80d includes an upper support ring 140 and a lower support ring 142. The upper support ring 140 includes a stepped bore 144 within which the upper head portion 52d of the kingpin 50d is received. The lower support ring 142 includes a cylindrically-shaped alignment portion 146 that cooperates to rotatably guide the kingpin 50d therewith, as described below. The upper support ring 140 and the lower support ring 142 each include a plurality of bolt-receiving apertures 48d spaced circumferentially thereabout. The kingpin 50d includes the upper head portion 52d, the lower head portion 54d, the body portion 56d, and the lock assembly receiving portion 58d. The upper head portion 52d includes a radially outwardly-extending portion 148 having a downwardly-extending, cylindrically-shaped alignment portion 150 spaced from the body portion 56d.

In assembly, the upper head portion 52d is received within the bore 144 of the upper support ring 140, while the alignment portion 146 of the lower support ring 142 and the alignment portion 150 of the kingpin 50d are coupled with one another such that the alignment portion 146 is aligned radially inward from the alignment portion 150 and rotatably guides the same. A wear disk 152 comprising material similar to the wear disk 35, is located with the bore 144 and between the upper head portion 52d of the kingpin 50d and the upper support ring 140. The kingpin 50d, the upper support ring 140 and the lower support ring 142 are positioned within the recess 82d of the housing 30d and secured therein by a plurality of bolts 68d extending through the apertures 48d of the upper support ring 140 and the lower support ring 142, and threadably received within the apertures 34d of the housing 30d.

The reference numeral 18e (FIGS. 15 and 16) generally designates another embodiment of the kingpin assembly. Since the kingpin assembly 18e is similar to the previously-described kingpin assembly 18 and kingpin assembly 18b, similar parts appearing in FIGS. 3 and 7-9 and FIGS. 15 and 16 respectfully are represented by the same, corresponding reference numeral, except for the suffix "e" in the numerals of the latter. In the illustrated example, the kingpin assembly 18e includes the housing 30e having a recess 82e and the plurality of apertures 34e spaced circumferentially thereabout. The collar member 38e is similar in configuration to the collar member 38b as described above, with the most notable exception being the configuration of the bolt apertures 48e, and particular that the bolt apertures 48e are threaded and extend downwardly into the collar member 38e. The kingpin 50e is also similar to the kingpin 50b as described above with the most notable exception being the removal of the aperture 124 therefrom. The kingpin assembly 18e further includes an upper support ring 154 having an upper flange 156 and an alignment portion. This particular configuration allows a top-down replacement of the kingpin 50e. Specifically, an access aperture extends through the associated trailer floor 162, thereby allowing the kingpin 50e to be moved downwardly into the collar member 38e, and the upper support ring 154 to be located such that the alignment portion 158 extends downwardly through the access aperture 160 and into the recess 82e of the housing 30e. The upper support ring 154 is held in position by a plurality of bolts 68e that extend downwardly through the plurality of circumferentially-spaced apertures 164 within the upper support ring 154, a plurality of apertures 166 circumferentially spaced about the access aperture 160 within the trailer floor 162, the plurality of apertures 34e extending through the housing 30e, and the threaded apertures 48e of the collar member 38e. As is best illustrated in FIG. 15, a wear disk 152e is located between the upper support ring 154 and the kingpin 50e. This particular configuration allows the kingpin 50e to be removed from the interior of the associated trailer.

The reference numeral 18f (FIGS. 17-19) generally designates another embodiment of the present inventive kingpin assembly. Since the kingpin assembly 18f is similar to the previously-described kingpin assembly 18 and kingpin assembly 18e, similar parts appearing in FIGS. 3, 15 and 16 and FIGS. 17-19, respectively are represented by the same, corresponding reference numeral except for the suffix "f" in the numerals of the latter. In the illustrated example, the kingpin assembly 18f is similar to the kingpin assembly 18e with the most notable exceptions being the bottom-up assembly of the kingpin assembly 18f, and the inclusion of a mechanical-type bearing assembly 168. The bearing assembly 168 is positioned between the upper head portion 52f of the kingpin 50f and the stepped bore 170 extending through the collar member 38f and within which the kingpin 50f is rotatably received.

Figure 21:
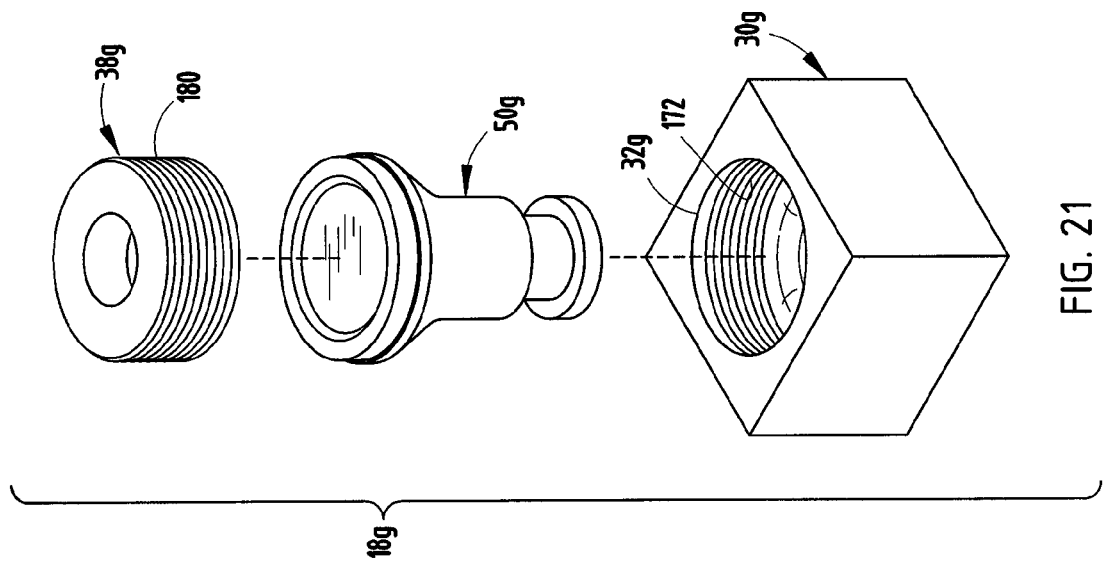
FIG. 21 is an exploded perspective view of the seventh alternative embodiment of the kingpin assembly.
Figure 20:
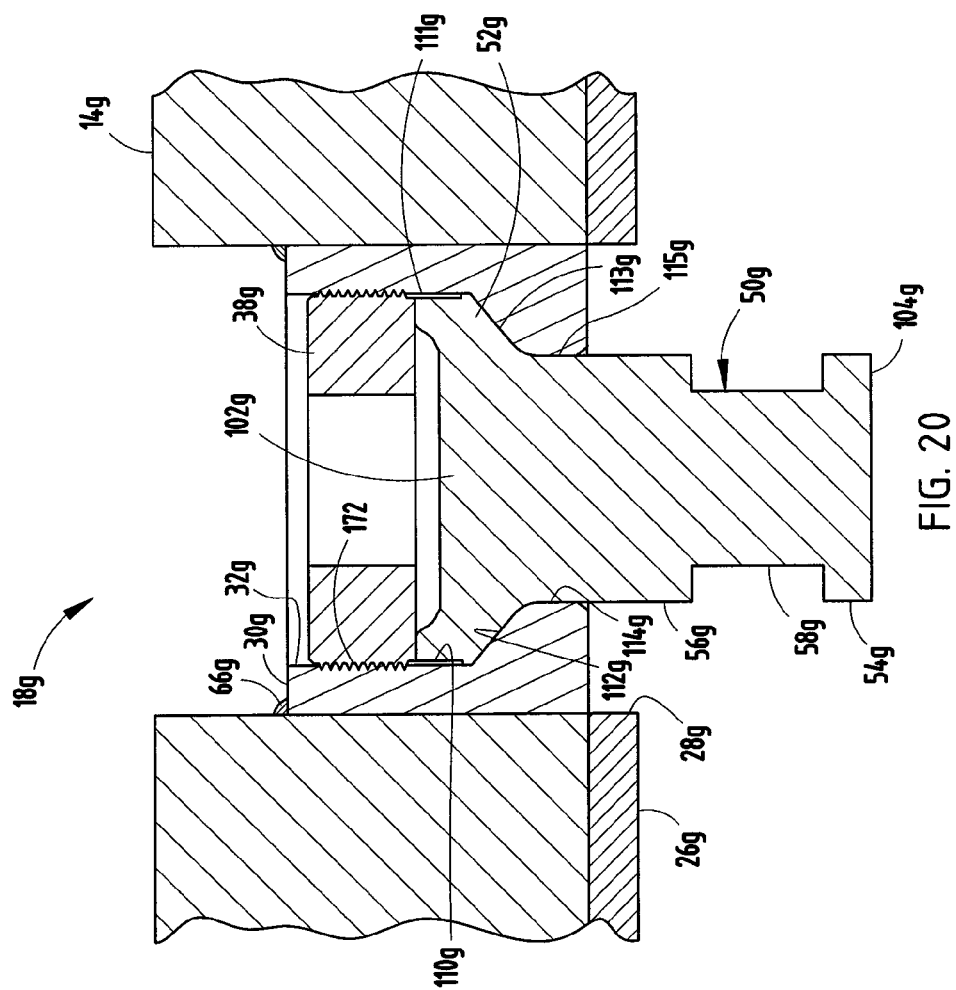
FIG. 20 is a cross-sectional side view of a seventh alternative embodiment of the kingpin assembly.

The reference numeral 18g (FIGS. 20 and 21) generally designates another embodiment of the present inventive kingpin assembly. Since the kingpin assembly 18g is similar to the previously-described kingpin assembly 18, similar parts appearing in FIG. 3 and FIGS. 20 and 21 respectfully are represented by the same, corresponding reference numeral, except for the suffix "g" in the numerals of the latter. The kingpin assembly 18g includes the collar member 38g and the kingpin 50g. This particular configuration allows a top-down replacement of the kingpin 50g from within the overall kingpin assembly 18g. The central bore or aperture 32g of the housing 30g includes an upper threaded portion 172, a cylindrically-shaped upper portion 110g, a conically-shaped middle portion 112g, and a cylindrically-shaped lower portion 114g, while the upper head portion 52g of the kingpin 50g includes a corresponding cylindrically-shaped portion 111g, a conically-shaped portion 113g and a cylindrically-shaped lower portion 115g. The collar member 38g is cylindrically-shaped and includes a threaded outer surface 180. In assembly, the housing 30g is weldably secured to the overall trailer assembly 14g via a plurality of welds 66g. The kingpin 50g is rotatably received within the bore 32g of the housing 30g in a top-down manner, and the collar member 38g is threadably coupled into the upper threaded portion 172 of the housing 30g, thereby rotatably securing the kingpin 50g within the housing 30g.

The reference numeral 18h (FIGS. 22 and 23) generally designates another embodiment of the present inventive kingpin assembly. Since the kingpin assembly 18h is similar to the previously described kingpin assembly 18 and kingpin assembly 18g, similar parts appearing in FIGS. 3, 20 and 21 and FIGS. 22 and 23 are respectively represented by the same, corresponding reference numeral, except for the suffix "h" in the numerals of the latter. The central recess or bore 82h of the housing 30h includes a beveled upper portion 182, a cylindrical portion 184, and a cylindrically-shaped, threaded lower portion 186. The collar member 38h includes a beveled upper surface 194 and a threaded outer surface 190. The upper head portion 52h of the kingpin 50h is isosceles trapezoidal-shaped and includes an upper beveled surface 190 corresponding to the beveled surface 182 of the housing 30h, a cylindrically-shaped portion 192 corresponding to the cylindrically-shaped portion 184 of the housing 30h, and a lower beveled surface 188 corresponding to the beveled surface 194 of the collar member 38h. In assembly, the kingpin 50h is rotatably held within the recess 82h by the collar member 38h when the threaded outer surface 190 of the collar member 38h is threadably coupled with the threaded portion 186 of the recess or bore 82h of the housing 30h.

The reference numeral 18i (FIGS. 24 and 25) generally designates another embodiment of the present inventive kingpin assembly. The kingpin assembly 18i includes a post member 200 surrounded by an outer sleeve member 202. The post member includes a plate-shaped body portion 204, and a cylindrically-shaped, downwardly-extending post portion 206. The post portion 206 includes a step 208 located along the length thereof, while the outer sleeve member 202 includes a longitudinally-extending central bore 210 having a corresponding step 212 located along the length thereof. The outer sleeve member 202 further includes a lower head portion 54i, a body portion 56i, a lock assembly-receiving portion 58i and a counter-sunk relief 214 extending into a distal end thereof. The kingpin assembly 18i still further includes a locking collar 216 having a threaded aperture 218.

In assembly, the body portion 204 of the post member 200 is weldably secured to a portion of the corresponding trailer, such as the trailer floor 162i by a plurality of welds 66i, such that the post portion 206 of the post member 200 extends downwardly through an aperture 160i within the trailer floor 162i. The outer sleeve member 202 is then positioned about the post member 200 by locating the bore 210 about the post portion 206. The outer sleeve member 202 is held in its rotatable position by the locking member 216 that is threaded about a plurality of threads 220 located at a distal end of the post portion 206, and such that a beveled surface 222 of the locking collar 216 abuts a corresponding beveled surface 224 of the bore 210. A seal member such as an o-ring 226 may be positioned between the post member 200 and the outer sleeve member 202 and received within circumferentially-extending apertures 228 located therein. A wear disk 152i may be placed between the post member 200 and the outer sleeve member 202.

The reference numeral 18j (FIGS. 26 and 27) generally designates another embodiment of the present inventive kingpin assembly. Since the kingpin assembly 18j is similar to the previously described kingpin assembly 18, similar parts appearing in FIG. 3 and FIGS. 26-29 respectively are represented by the same, corresponding reference numeral, except for the suffix "j" in the numerals of the latter. The kingpin assembly 18j includes an upper support member 240, a collar member 242, and a kingpin 50j. The upper support member 240 includes a centrally-located, cylindrically-shaped pocket 244, a pair of downwardly-exposed, juxtaposed guide channels 246, a pair of spring-relief pockets 248, and a plurality of bolt-receiving apertures 250 spaced about the circumference thereof. The collar member 242 includes a pair of guide channels 251 that are aligned with the guide channels 246, a recess 253, and a plurality of release bolt-receiving apertures 254 spaced about the circumference thereof. The body portion 56j of the kingpin 50j includes a recess 256 extending circumferentially thereabout and located near the proximal end 102j. The kingpin assembly 18j further includes a pair of arcuately-shaped locking members 260 located within the recess 253 of the collar member 242, and including a channel 252 located along the length thereof and beveled outer surface 262.

In assembly, the overhead portion 52j of the kingpin 50j is located within the pocket 244 of the upper support member 240, while the body portion 58j of the kingpin 50j extends through an aperture 40j of the collar support member 242. The kingpin 50j is held in rotatable cooperation with the remaining portions of the assembly by the locking members 260. Specifically, the locking members are positioned such that at least a portion of the locking members extend into the recess or groove 256 of the kingpin 50j thereby preventing axial movement of the kingpin 50j with respect to the upper support member 240 and collar member 242. The locking members 260 are held into position by a plurality of tension adjustment bolts 264 threadably received within the apertures 254 of the collar member 242. Each of the adjustment bolts 264 include a beveled end 266 that impinge or engage upon the beveled surface 262 of a respective locking member 260, thereby forcing the locking member 260 into engagement within the recess or groove 256 of the kingpin 50j. The locking members 260 are held in alignment with the upper support member 240 and the collar support member 242 by a key member (not shown) received within the guide channels 246, 251, 252 respectively thereof. As is best illustrated in FIGS. 28 and 29, a pair of coil springs 268 are positioned between and abut each of the locking members 260, thereby biasing the locking members 260 in a radially outward direction. When the adjustment bolts 264 are retracted from within the apertures 254, the coil springs 268 force the locking members 260 radially outward, thereby allowing the kingpin 50j to be removed from within the upper support member 240 and the collar member 242.

The kingpin 50j is positioned such that the upper head portion 52j is located within the pocket 244 of the upper support member 240. The adjustment bolts 264 are then threaded into the apertures 254 until they impinge upon the locking members 260, thereby overcoming the biasing force exerted on the locking members 260 by the coil springs 268, and forcing the locking members 260 into engagement within the recess 256 of the kingpin 50j.

The reference numeral 18k (FIGS. 30-32) generally designates another embodiment of the present inventive kingpin assembly. Since the kingpin assembly 18k is similar to the previously described kingpin assembly 18 and kingpin assembly 18h, similar parts appearing in FIGS. 3, 22 and 23 and FIGS. 30-32 respectively are represented by the same, corresponding reference numeral, except for the suffix "k" in the numerals of the latter. The kingpin assembly 18k is similar in construction and assembly to the kingpin assembly 18h with the most notable exception being the inclusion of an upwardly-extending alignment portion 280 of the kingpin 50k, and an alignment receiving portion 282 of the recess or bore 82k of the housing 30k that receives the alignment portion 280 therein. The alignment portion 280 includes a aperture 284 extending therethrough, while the portion 282 of the bore 82k includes an circumferentially-extending groove 288 aligned with the aperture 284. The assembly further includes a quick-connect assembly 290 comprising a pair of bearings 292 and a biasing spring member 294. In assembly, the quick-connect assembly allows temporary assembly of the kingpin 50k within the housing 30k, while allowing the operator to use both hands to complete the task of permanently securing the kingpin 50k within the housing 30k. Specifically, the bearings 292 and the spring member 294 are positioned within the channel 284, and the kingpin 50k is then placed within the bore 82k of the housing 30k until the bearings 292 are biased outwardly by the spring 294 and engage the groove 288 of the housing 30k. The collar member 38k is then positioned about the kingpin 50k and threadably received within the housing 30k thereby rotatably securing the kingpin 50k within the housing 30k.

The reference numeral 18m (FIGS. 33-35) generally designates another embodiment of the present inventive kingpin assembly. Since the kingpin assembly 18m is similar to the previously described kingpin assembly 18k, similar parts appearing in FIGS. 30-32 and FIGS. 33-35 respectively are represented by the same, corresponding reference numeral, except for the suffix "m" in the numerals of the latter. The kingpin assembly 18m is similar in construction of assembly to the kingpin assembly 18k with the most notable exception being the removal of the quick-connect assembly 290 and the addition of an alignment ring 298. The alignment ring 298 extends upwardly from the upper head portion 52m of the kingpin 50m, and is received within a corresponding ring-shaped channel 300 extending into an upper surface 302 of the recess 82m of the housing 30m. The alignment ring 298 assists in maintaining axial alignment of the kingpin 50m with the housing 30m and the collar member 38m.

The reference numeral 18n (FIGS. 36-38) generally designates another embodiment of the present inventive kingpin assembly. Since the kingpin assembly 18n is similar to the previously described kingpin assembly 18d, similar parts appearing in FIGS. 13 and 14 and FIGS. 36-38 respectively are represented by the same, corresponding reference numeral, except for the suffix "n" in the numerals of the latter. In the illustrated example, the kingpin assembly 18n is similar in construction and assembly to the kingpin assembly 18d with the most notable exception being the bifurcation of the kingpin 50n into two parts, including an upper portion 304, that includes the upper head portion 52n and the body portion 56n, and a lower portion 306 that includes the lower head portion 54n and the lock assembly receiving portion 58n. The upper portion 304 includes a threaded bore 308 that receives a threaded portion 310 of the lower portion 306 therein thereby allowing replacement of the portion of the kingpin 50*n* most likely to require replacement due to normal wear.

The present inventive kingpin assembly allows free rotation of the kingpin by reducing operational wear of the same, allows easy access to and replacement of an associated kingpin subsequent to wear thereof, reduces the amount of maintenance typically required for fifth wheel hitch assemblies, and reduces wear due to debris entering the overall assembly. Further, the present inventive assembly is more durable, allows replacement of certain components thereof by even unskilled personnel, is extremely efficient in use, capable of a long operating life, and particularly well adapted for the proposed use.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A kingpin assembly, comprising:
    a housing having a recess located therein;
    a collar member operably coupled to the housing member; and
    an integral single-piece kingpin having at least a portion located within the recess of the housing, wherein the housing and collar cooperate to rotationally secure the kingpin within the recess of the housing, and wherein the kingpin provides a sole rotational support for the kingpin with respect to the housing and the collar for free rotation of the kingpin with respect to the housing subsequent to assembly of the collar with the housing.

2. The kingpin assembly of claim 1, wherein the collar member includes an aperture through which the kingpin extends.

3. The kingpin assembly of claim 1, wherein the collar comprises a single integral piece.

4. The kingpin assembly of claim 1, wherein the kingpin includes a first surface and the collar member includes a second surface that abut one another, and wherein at least a portion of the first surface and the second surface are each arcuately shaped.

5. The kingpin assembly of claim 1, further including:
    a seal member located between the kingpin and at least a select one of the housing and the collar member.

6. The kingpin assembly of claim 1, wherein the collar member is operably coupled to the housing by a plurality of bolts.

7. The kingpin assembly of claim 1, wherein the collar member is threadably received within the housing.

8. The kingpin assembly of claim 1, further including:
    a bearing member located within the recess of the housing, wherein the kingpin is rotatably coupled with the bearing member.

9. The kingpin assembly of claim 8, wherein the bearing member and the kingpin include conically-shaped bearing surfaces that abut one another.

10. The kingpin assembly of claim 8, wherein the bearing member is a mechanical-type bearing.

11. The kingpin assembly of claim 1, wherein the bearing member comprises at least two separate, arcuately-shaped portions that are at least partially received within a circumferentially extending relief within the kingpin, and that cooperate to rotatably secure the kingpin with in the housing.

12. The kingpin assembly of claim 1, wherein the collar and the kingpin each include conically-shaped bearing surfaces that abut one another.

13. The kingpin assembly of claim 1, wherein the kingpin comprises a single, integral piece having a tapered neck portion adapted to be received within a locking arrangement of a fifth wheel assembly, and a head portion located at a proximal end of the kingpin, and the head portion of the kingpin has a diameter that is greater than a diameter of any other portion of the kingpin.

14. The kingpin assembly of claim 1, further including:
    a support ring removably coupled above the housing and that allows replacement of the kingpin without uncoupling the collar member from the housing.

* * * * *